(12) United States Patent
Watanabe et al.

(10) Patent No.: US 12,508,981 B2
(45) Date of Patent: Dec. 30, 2025

(54) LAMP SYSTEM

(71) Applicant: Koito Manufacturing Co., Ltd., Tokyo (JP)

(72) Inventors: Shigeyuki Watanabe, Shizuoka (JP); Takao Muramatsu, Shizuoka (JP); Yasushi Noyori, Shizuoka (JP); Takashi Terayama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/666,022

(22) Filed: May 16, 2024

(65) Prior Publication Data

US 2025/0042327 A1    Feb. 6, 2025

Related U.S. Application Data

(63) Continuation of application No. PCT/JP2022/042446, filed on Nov. 15, 2022.

(30) Foreign Application Priority Data

Nov. 17, 2021    (JP) .................................. 2021-187330

(51) Int. Cl.
*B60Q 1/11*    (2006.01)
*B60Q 1/115*    (2006.01)

(52) U.S. Cl.
CPC ............... *B60Q 1/11* (2013.01); *B60Q 1/115* (2013.01); *B60Q 2300/054* (2013.01); *B60Q 2300/114* (2013.01); *B60Q 2300/132* (2013.01)

(58) Field of Classification Search
CPC .... B60Q 1/11; B60Q 1/115; B60Q 2300/054; B60Q 2300/114; B60Q 2300/132
See application file for complete search history.

(56) References Cited

U.S. PATENT DOCUMENTS 6,229,263 B1    5/2001    Izawa
7,014,345 B2 *  3/2006    Toda ........................ B60Q 1/10
                                                    362/465

(Continued)

FOREIGN PATENT DOCUMENTS

JP    2000211423 A    8/2000
JP    2004071409 A    3/2004

(Continued)

OTHER PUBLICATIONS

International Search Report (Form PCT/ISA/210) issued on Dec. 20, 2022, by the Japanese Patent Office in corresponding International Application No. PCT/JP2022/042446, with English Translation. (6 pages).

(Continued)

*Primary Examiner* — Zheng Song
(74) *Attorney, Agent, or Firm* — BUCHANAN, INGERSOLL & ROONEY PC

(57) ABSTRACT

A high-definition lamp unit includes a plurality of individually controllable pixels, and emits lamp light having a light distribution corresponding to states of the plurality of pixels. A leveling actuator can control a mechanical position of the high-definition lamp unit. A controller controls the leveling actuator and the high-definition lamp unit according to a pitch angle of a vehicle body.

2 Claims, 34 Drawing Sheets

(56) References Cited

U.S. PATENT DOCUMENTS

| | | | |
|---|---|---|---|
| 7,427,151 B2* | 9/2008 | Okubo | F21S 41/155 |
| | | | 362/545 |
| 2004/0027834 A1 | 2/2004 | Chigusa et al. | |
| 2004/0227834 A1* | 11/2004 | Yokokawa | H04N 1/00442 |
| | | | 348/333.01 |
| 2009/0067184 A1* | 3/2009 | Kamioka | B60Q 1/085 |
| | | | 362/464 |
| 2009/0086496 A1* | 4/2009 | Todani | B60Q 1/10 |
| | | | 362/465 |
| 2012/0002430 A1* | 1/2012 | Yamazaki | B60Q 1/10 |
| | | | 362/464 |
| 2018/0079352 A1* | 3/2018 | Dalal | H05B 45/50 |

FOREIGN PATENT DOCUMENTS

| | | |
|---|---|---|
| JP | 2017056828 A | 3/2017 |
| JP | 2021138278 A | 9/2021 |

OTHER PUBLICATIONS

International Preliminary Report on Patentability (Form PCT/IB/373) and the Written Opinion of the International Searching Authority (Form PCT/ISA/237) issued on May 2, 2024, by the International Bureau of WIPO, in corresponding International Application No. PCT/JP2022/042446. (8 pages).

\* cited by examiner

FIG. 2A DURING STOP

FIG. 2B DURING TRAVELING

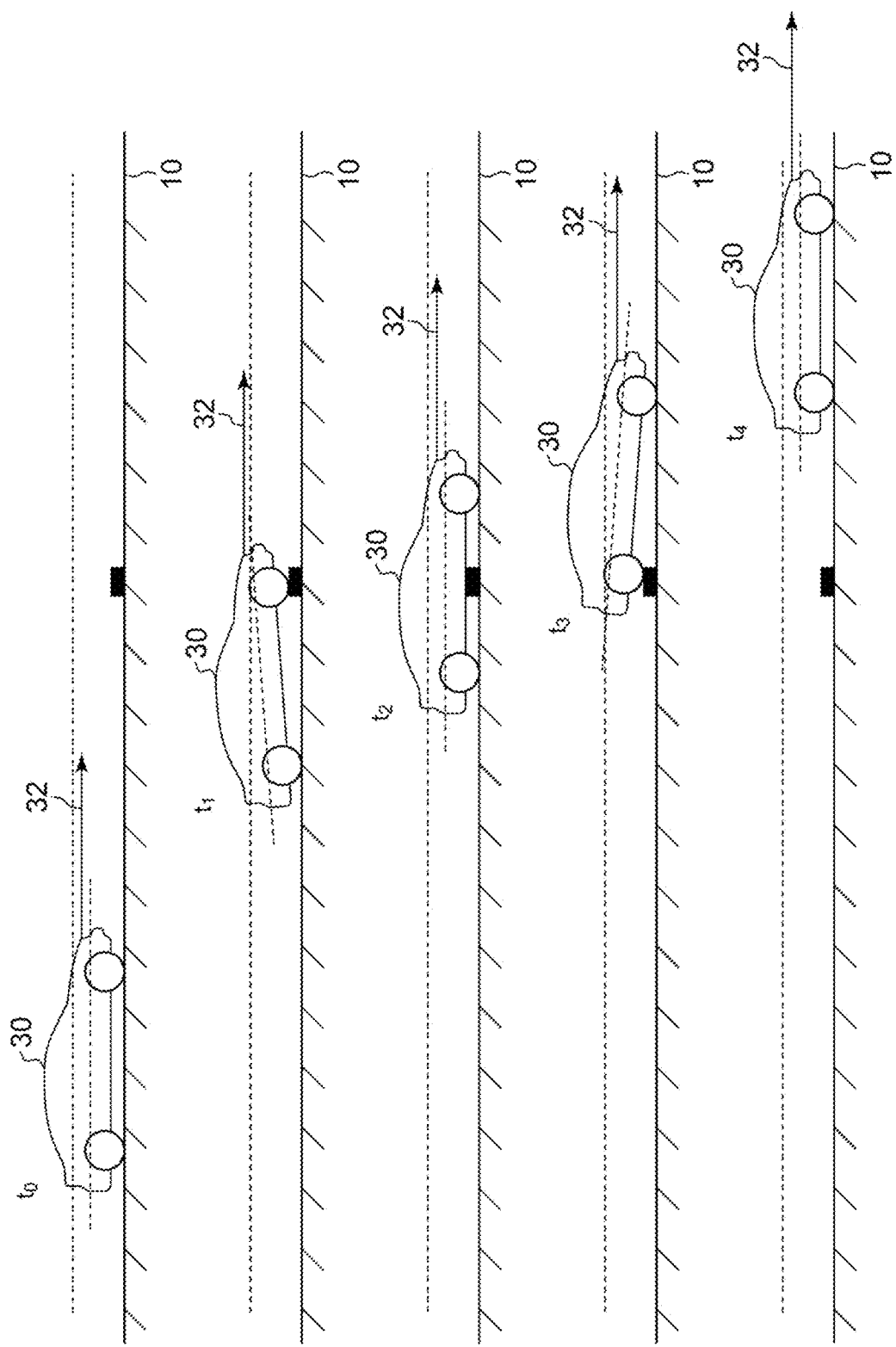

LAMP SYSTEM

BACKGROUND

1. Technical Field

The present disclosure relates to a vehicle lamp.

2. Description of the Related Art

A light distribution pattern of a headlamp is defined by regulations so that a headlamp of an automobile does not give glare to surrounding traffic participants. A longitudinal inclination of a vehicle body changes according to the number of passengers and the weight of baggage. As a result, an inclination of a road surface (ground) and an optical axis of the headlamp changes, whereby an irradiation range of the headlamp changes in a vertical direction. When the irradiation range is shifted upward, glare may be given, and when the irradiation range is shifted downward, the irradiation range in front of the vehicle is narrowed.

In order to correct the change in the optical axis of the headlamp based on the change in the longitudinal inclination of the vehicle body, a leveling actuator is incorporated in the headlamp. There is a technique called auto leveling that automatically controls the leveling actuator according to the inclination of the vehicle body. In auto leveling, an inclination in a front-rear direction of the vehicle body is acquired by a sensor provided in the vehicle body, and an optical axis of a lamp unit in the headlamp is corrected by the leveling actuator so as to cancel the inclination.

Conventional auto leveling has been designed to focus on satisfying regulations that do not give glare to surrounding traffic participants, and there have been many cases where glare associated with steep vehicle body vibration during driving is allowed.

SUMMARY

The disclosure has been made in such a situation, and one exemplary object thereof is to provide a lamp system capable of suppressing glare associated with steep vehicle body vibration during traveling.

A lamp system according to an aspect of the disclosure includes a light distribution variable lamp including a plurality of individually controllable pixels and structured to emit lamp light having a light distribution according to states of the plurality of pixels, a leveling actuator structured to control a mechanical position of the light distribution variable lamp, and a controller structured to control the leveling actuator and the light distribution variable lamp according to a pitch angle of a vehicle body.

Note that any combinations of the components and mutual replacements of components and expressions among methods, devices, systems, etc. are also effective as aspects of the invention or the disclosure. Furthermore, the description of this item (means for solving the problem) does not describe all essential features of the invention, and thus sub-combinations of these features described may also be the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a diagram illustrating a light beam corresponding to a cutoff line of lamp light of a headlamp in the traveling scene of FIG. 4;

FIG. 15 is a diagram for describing a second pitch angle θa;

DETAILED DESCRIPTION

Overview of Embodiments

Figure 1:
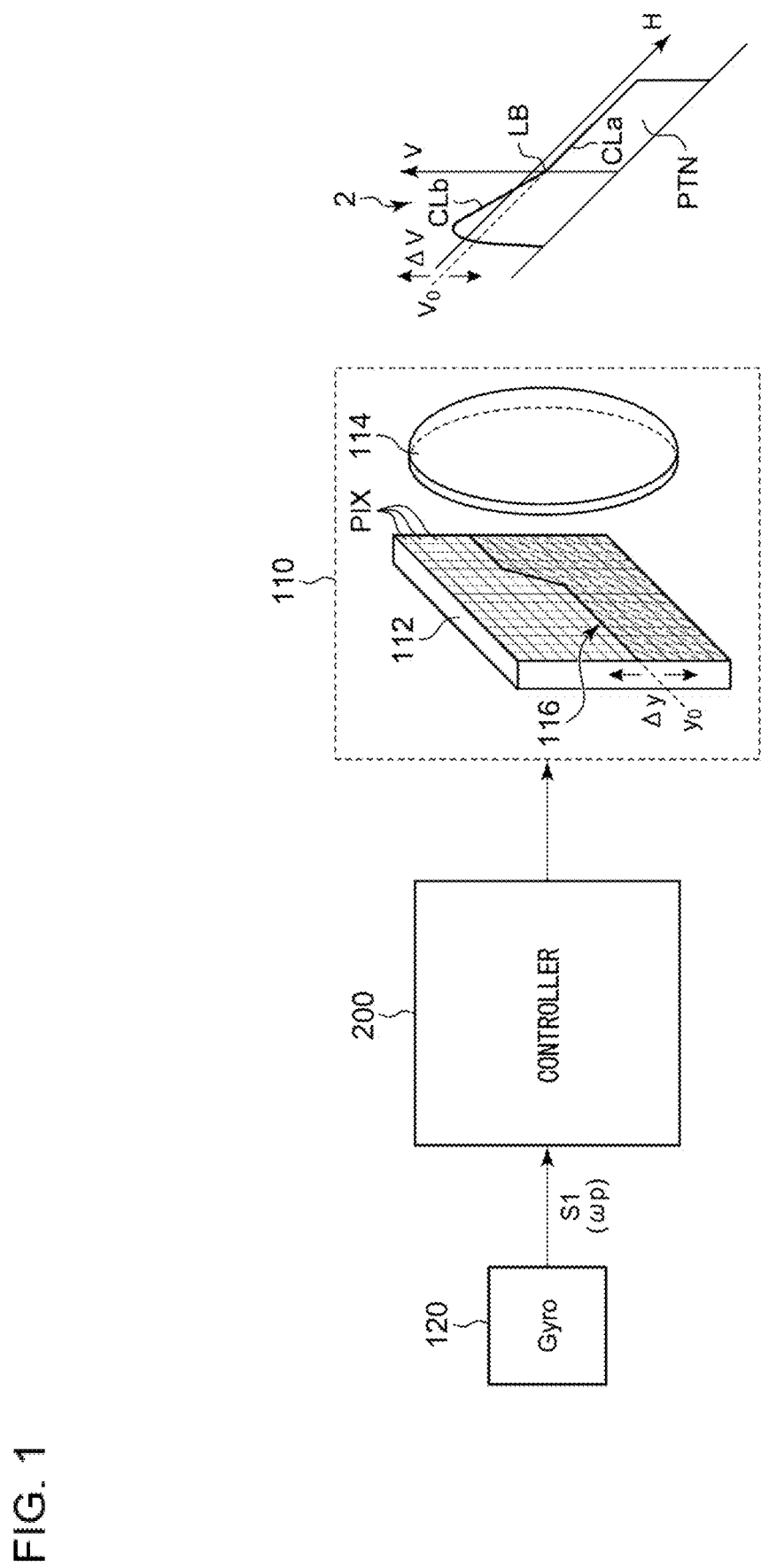
FIG. 1 is a block diagram of a lamp system according to a first embodiment.

An overview of some example embodiments of the disclosure will be described. This overview describes some concepts of one or more embodiments in a simplified manner for the purpose of basic understanding of the embodiments as a prelude to the detailed description that follows, and does not limit the breadth of the invention or disclosure. Also, this overview is not a comprehensive overview of all possible embodiments and does not limit the essential components of the embodiments. For convenience, "one embodiment" may be used to refer to one embodiment (example or modification) or a plurality of embodiments (examples or modifications) disclosed in the present specification.

A lamp system according to an embodiment includes a light distribution variable lamp including a plurality of individually controllable pixels and structured to emit lamp light having a light distribution according to states of the plurality of pixels, a leveling actuator structured to control a mechanical position of the light distribution variable lamp, and a controller structured to control the leveling actuator and the light distribution variable lamp according to a pitch angle of a vehicle body.

A combination of mechanical leveling by the leveling actuator and electronic leveling by pixel control of the light distribution variable lamp enables flexible and high-speed leveling control.

In one embodiment, the controller may control the leveling actuator according to a static component of the pitch angle of the vehicle body, and control the light distribution variable lamp according to a dynamic component of the pitch angle of the vehicle body.

In one embodiment, the lamp system may further include a first sensor including a gyro sensor. The controller may control the light distribution variable lamp according to output of the first sensor.

In one embodiment, the lamp system may further include a second sensor including a vehicle height sensor and an acceleration sensor. The controller may control the leveling actuator according to output of the second sensor.

In one embodiment, the lamp system may further include a fixed light distribution lamp forming a fixed light distribution, and a lamp bracket supporting the fixed light distribution lamp and the light distribution variable lamp. The leveling actuator can control a position of the lamp bracket.

EMBODIMENTS

Hereinafter, preferred embodiments will be described with reference to the drawings. The same or equivalent components, members, and processes illustrated in the respective drawings are denoted by the same reference numerals, and redundant description will be omitted as appropriate. In addition, the embodiments are not intended to limit the disclosure, but are merely examples, and all features described in the embodiments and combinations thereof are not necessarily essential to the disclosure.

In the present specification, "a state in which a member A is connected to a member B" includes not only a case where the member A and the member B are physically and directly connected to each other, but also a case where the member A and the member B are indirectly connected to each other via another member which does not substantially affect an electrical connection state therebetween or which does not impair a function or an effect exhibited by coupling thereof.

Similarly, "a state in which a member C is provided between a member A and a member B" includes not only a case where the member A and the member C or the member B and the member C are directly connected to each other, but also a case where the members are indirectly connected to each other via another member which does not substantially affect an electrical connection state therebetween or which does not impair a function or an effect exhibited by coupling thereof.

First Embodiment

FIG. 1 is a block diagram of a lamp system 100 according to a first embodiment. The lamp system 100 is a headlamp that is mounted on an automobile and irradiates a visual field in front of a vehicle with light. In the automobile, an inclination angle in a front-rear direction changes according to the front-rear weight balance. The inclination angle in the front-rear direction corresponds to rotation around a horizontal axis extending to the left and right of the vehicle body, and is referred to as a pitch angle θp.

The lamp system 100 has a function (auto leveling function) of automatically adjusting an optical axis of the headlamp in a pitch direction according to the pitch angle θp.

The lamp system 100 includes a high-definition lamp unit 110, a sensor 120, and a controller 200.

In the present embodiment, the high-definition lamp unit 110 is a light distribution variable lamp configured to be able to irradiate a part or all of a low-beam region. The high-definition lamp unit 110 may cover a part/all of a high-beam region in addition to the part/all of the low-beam region. The high-definition lamp unit 110 includes a plurality of individually controllable pixels PIX, and emits lamp light having a light distribution corresponding to states of the plurality of pixels PIX. For example, the high-definition lamp unit 110 includes a light emitting element array 112 and an irradiation optical system 114. As the light emitting element array 112, an LED array can be used.

The luminance of each of the pixels PIX may be controllable in two gradations of ON and OFF, or may be controllable in multiple gradations. Further, when the control can be performed with two gradations of ON and OFF, each pixel PIX is switched at high speed, and a time ratio (duty cycle) between an ON time and tan OFF time is changed, so that the multi gradations may be expressed by PWM dimming.

The irradiation optical system 114 projects output light of the light emitting element array 112 to the front of the vehicle. The irradiation optical system 114 may be a lens optical system, a reflection optical system, or a combination thereof.

FIG. 1 illustrates a virtual vertical screen 2. It is assumed that the virtual vertical screen 2 is a coordinate system based on a road surface. A distance between the virtual vertical screen 2 and the vehicle (lamp) can be set to 10 m or 25 m. On the virtual vertical screen 2, a light distribution pattern PTN is formed by lamp light of the high-definition lamp unit 110. The light distribution pattern PTN is an intensity distribution of the lamp light on the virtual vertical screen 2, and is based on an ON and OFF pattern of each of the plurality of pixels PIX of the light emitting element array 112. Note that a correspondence between a position of a certain pixel and an irradiation region on the virtual vertical screen 2 corresponding to the pixel is determined by the irradiation optical system 114, and a mirror image relationship (left-right inversion), up-down inversion, or up-down and left-right inversion may be performed.

The light distribution pattern PTN includes a cutoff line CL. In this example, the light distribution pattern PTN includes a horizontal cutoff line CLa and an oblique cutoff line CLb, which intersect at an elbow point LB.

In the present embodiment, the controller 200 corrects an optical axis of a low beam in a pitch angle direction according to the variation of the pitch angle $\theta p$ caused by various factors while the vehicle is stationary and traveling.

Figure 2:
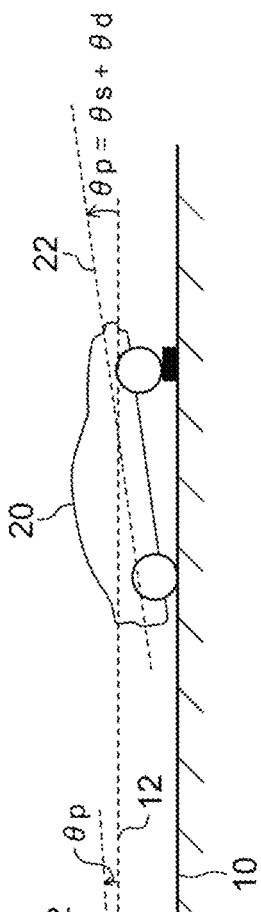
FIGS. 2A and 2B are diagrams for describing a pitch angle θp of a vehicle body.

FIGS. 2A and 2B are diagrams for describing the pitch angle $\theta p$ of the vehicle body. FIG. 2A illustrates the pitch angle $\theta p$ in a state where the vehicle is stopped. The pitch angle $\theta p$ in a stationary state of the vehicle is defined as a static pitch angle $\theta s$. The static pitch angle $\theta s$ indicates an attitude of the vehicle when the vehicle is stopped, and thus is also referred to as a stopped vehicle attitude angle. The static pitch angle $\theta s$ is determined according to the number of passengers, a riding position, the weight of baggage in a baggage room, hardness of front and rear suspensions, etc. In the present embodiment, an angle formed by a straight line 12 parallel to a road surface 10 and a reference line 22 of the vehicle body 20 is defined as the pitch angle $\theta p$, and a direction in which the reference line 22 faces upward (a nose-up direction) is assumed to be positive.

FIG. 2B illustrates the pitch angle $\theta p$ while the vehicle is traveling. The pitch angle $\theta p$ during traveling of the vehicle can be understood as the sum of the static pitch angle $\theta s$ and a dynamic component (also referred to as a dynamic pitch angle or a variation amount of the pitch angle) $\theta d$. The dynamic pitch angle $\theta d$ may include the following components.

(i) Nose up associated with acceleration of vehicle body, and nose down associated with deceleration
 (ii) Change in weight (weight balance) of vehicle body due to inclination of road surface, etc.
 (iii) Fast vibration of vehicle body due to unevenness of road surface (i) Variation of the pitch angle associated with acceleration of the vehicle body or (ii) change in the pitch angle associated with a weight change of the vehicle body last for several seconds, and thus are typically DC variations and can be considered to have significantly low frequency components (0.5 Hz or less).

On the other hand, (iii) vibration of the vehicle body caused by unevenness of the road surface depends on the hardness of the suspension and the vehicle weight, and is included in a range of about 0.5 to 5 Hz. As an example, the steep vehicle body vibration is 0.9 to 2 Hz.

In the conventional leveling control, vibration exceeding approximately 0.5 Hz has been removed as noise by a filter. Therefore, in the conventional method, among (i) to (iii), a fast pitch angle variation exceeding a cutoff frequency of the filter is excluded from a target of correction, and when a steep change in the vehicle pitch angle occurs due to steep unevenness of the road surface, etc. during traveling, sinking or floating of a cutoff line of a low beam occurs.

On the other hand, in the present embodiment, a frequency component (approximately 0.5 to 5 Hz, e.g. 1 to 2 Hz) exceeding 0.5 Hz of the pitch angle variation, which has been conventionally removed as noise, is not removed as noise and is actively corrected. In the present specification, optical axis correction for correcting pitch angle variation during traveling is referred to as dynamic leveling.

Returning to FIG. 1. Hereinafter, dynamic leveling, in particular, leveling against high-speed pitch angle variation due to unevenness of the road surface will be described in detail. The sensor 120 is provided so as to be able to detect a dynamic component $\theta d$ of the pitch angle $\theta p$ while the vehicle body is traveling.

In the present embodiment, the sensor 120 includes a gyro sensor. The gyro sensor is attached in any direction. Preferably, the gyro sensor is attached such that one detection axis of the gyro sensor faces left and right horizontal directions of the vehicle body, and a detection signal S1 indicating an angular velocity $\omega p$ of rotational movement around the detection axis is generated. The gyro sensor may have three axes or one axis.

The controller 200 is an electronic control unit (ECU) in which functions related to optical axis correction are integrated, and performs processing related to dynamic leveling. The controller 200 may be an ECU dedicated to leveling (also referred to as a leveling ECU), may be an ECU integrated with a controller having another function, and may be configured by being divided into a plurality of ECUs.

The function of the controller 200 may be realized by software processing, hardware processing, or a combination of software processing and hardware processing. Specifically, software processing is implemented by a combination of a processor (hardware) such as a central processing unit (CPU), a micro processing unit (MPU), or a microcontroller and a software program executed by the processor (hardware). The controller 200 may be a combination of a plurality of processors (microcontrollers).

Specifically, the hardware processing is implemented by hardware such as an application specific integrated circuit (ASIC), a controller IC, or a field programmable gate array (FPGA).

The controller 200 detects the dynamic component $\theta d$ of the pitch angle $\theta p$ during traveling of the vehicle by integrating the angular velocity $\omega p$ indicated by the detection signal S1. Here, the dynamic component $\theta d$ can be regarded as a component included in a predetermined frequency band higher than 0.5 Hz in variation of the pitch angle $\theta p$. For example, a component included in the predetermined frequency band in the variation of the pitch angle $\theta p$ is a correction target as a dynamic component. The predetermined frequency band can be defined in a range of, for example, about 0.5 Hz to 5 Hz. Which frequency band is set as the correction target may be determined based on the hardness of the suspension, the mass of the vehicle body, etc.

Then, the controller 200 moves a position (position in a vertical direction V, that is, optical axis) of the cutoff line CL of the light distribution pattern PTN with reference to a predetermined position $v_0$ according to the dynamic component $\theta d$ of the pitch angle $\theta p$ of the traveling vehicle body. In the conventional leveling control, the optical axis is moved only in a downward direction for the purpose of suppressing glare. On the other hand, in the dynamic leveling according to the present embodiment, the position of the cutoff line CL is actively moved not only in the downward direction but also in an upward direction.

Note that controlling the position of the cutoff line CL includes (1) a case where only the position of the cutoff line is changed up and down by fixing a lower end of the light distribution of the lamp, and (2) a case where a position of a lower end of the light distribution of the lamp is changed up and down following the position of the cutoff line, in other words, a case where the entire light distribution of the lamp is moved up and down.

The controller 200 moves the cutoff line CL in the downward direction corresponding to the positive dynamic pitch angle θd. In the present embodiment, the controller 200 further actively moves the cutoff line CL in the upward direction corresponding to the negative dynamic pitch angle θd.

More specifically, the controller 200 moves the position of the cutoff line CL in the upward direction and the downward direction with reference to the predetermined position $V_0$ so as to cancel the dynamic component Od of the pitch angle θp. The predetermined position $V_0$ is coordinates in the vertical direction where the cutoff line CL should be located when the variation of the pitch angle θp is zero.

For example, the controller 200 changes an ON and OFF boundary 116 of the plurality of pixels PIX of the light emitting element array 112 in order to raise and lower the cutoff line CL on the virtual vertical screen 2. How many pixels of the boundary 116 are shifted with respect to a certain variation range of the pitch angle θp can be geometrically and optically determined. The shift amount of the pixels is set to Δy.

Figure 3:
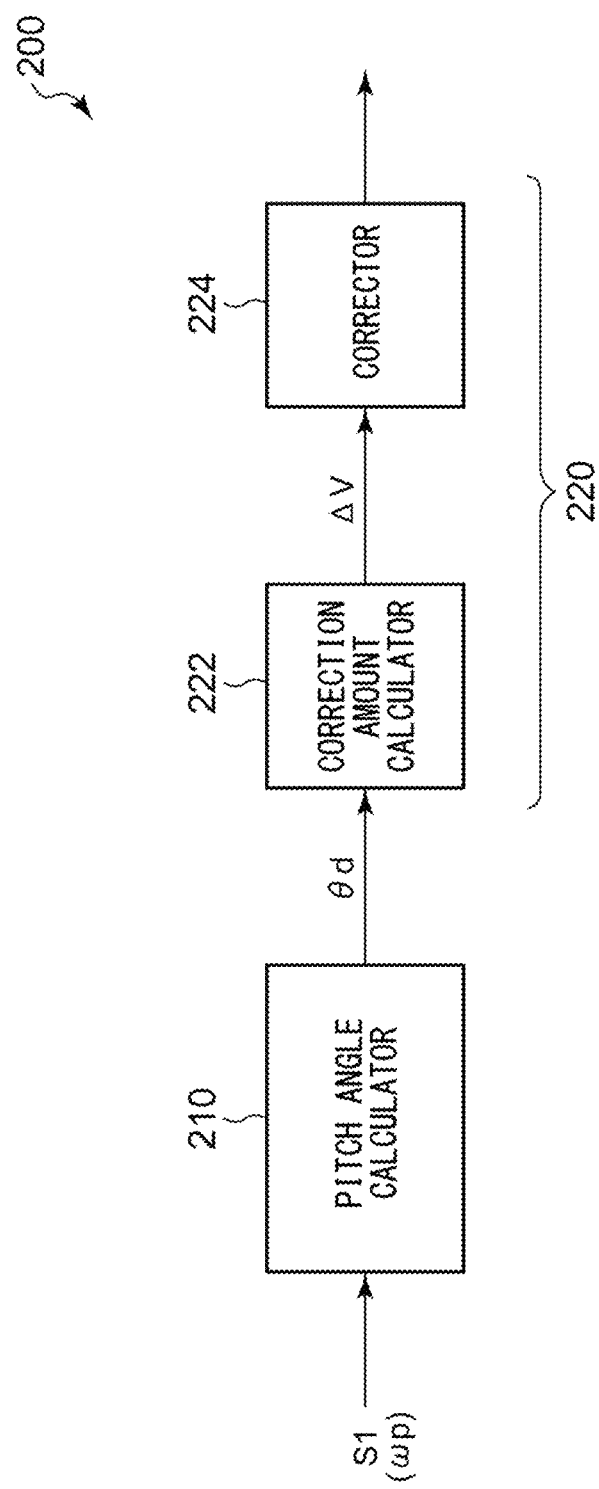
FIG. 3 is a functional block diagram of a controller.

FIG. 3 is a functional block diagram of the controller 200. The controller 200 includes a pitch angle calculator 210 and a cutoff line controller 220.

The pitch angle calculator 210 detects the dynamic component Od of the pitch angle θp based on output of the sensor 120. For example, the pitch angle calculator 210 integrates the angular velocity op indicated by the detection signal S1. Furthermore, the pitch angle calculator 210 performs arithmetic processing on an integral value as necessary to calculate the dynamic pitch angle θd. This arithmetic processing can include filter processing (band limiting processing), moving average processing, etc.

The cutoff line controller 220 raises and lowers the position of the cutoff line CL based on the dynamic pitch angle θd. The cutoff line controller 220 includes a correction amount calculator 222 and a corrector 224. The correction amount calculator 222 calculates a movement amount (correction amount ΔV) of the cutoff line CL in an up-down direction on the virtual vertical screen 2 based on the dynamic pitch angle θd. In the present embodiment, the positive correction amount ΔV corresponds to the upward shift of the cutoff line CL, and the negative correction amount ΔV corresponds to the downward shift of the cutoff line CL. The corrector 224 controls the light emitting element array 112 so that the cutoff line CL moves by the correction amount ΔV.

For example, the light emitting element array 112 has an interface using image data that designates ON and OFF (or luminance) of the plurality of pixels PIX as input. In this case, the corrector 224 may shift the position of the boundary 116 between an ON-pixel and an OFF-pixel included in the image data up and down by the number of pixels Δy corresponding to the correction amount ΔV. That is, the corrector 224 moves the position (boundary 116) of the cutoff line CL of the light distribution pattern included in the image data in the upward direction and the downward direction with respect to a predetermined position $y_0$ so as to cancel the dynamic component Od of the pitch angle θp. The predetermined position $y_0$ is a reference position corresponding to $V_0$.

In addition to the position (height) of the boundary 116 between the ON-pixel and the OFF-pixel corresponding to the cutoff line CL, the corrector 224 may shift the position (height) of the boundary between the ON-pixel and the OFF-pixel corresponding to the lower end of the light distribution pattern up and down by the number of pixels Δy corresponding to the correction amount ΔV. That is, the corrector 224 may shift the entire light distribution pattern up and down by the number of pixels Δy corresponding to the correction amount ΔV.

The configuration of the lamp system 100 has been described above. Next, an operation will be described.

Figure 4:
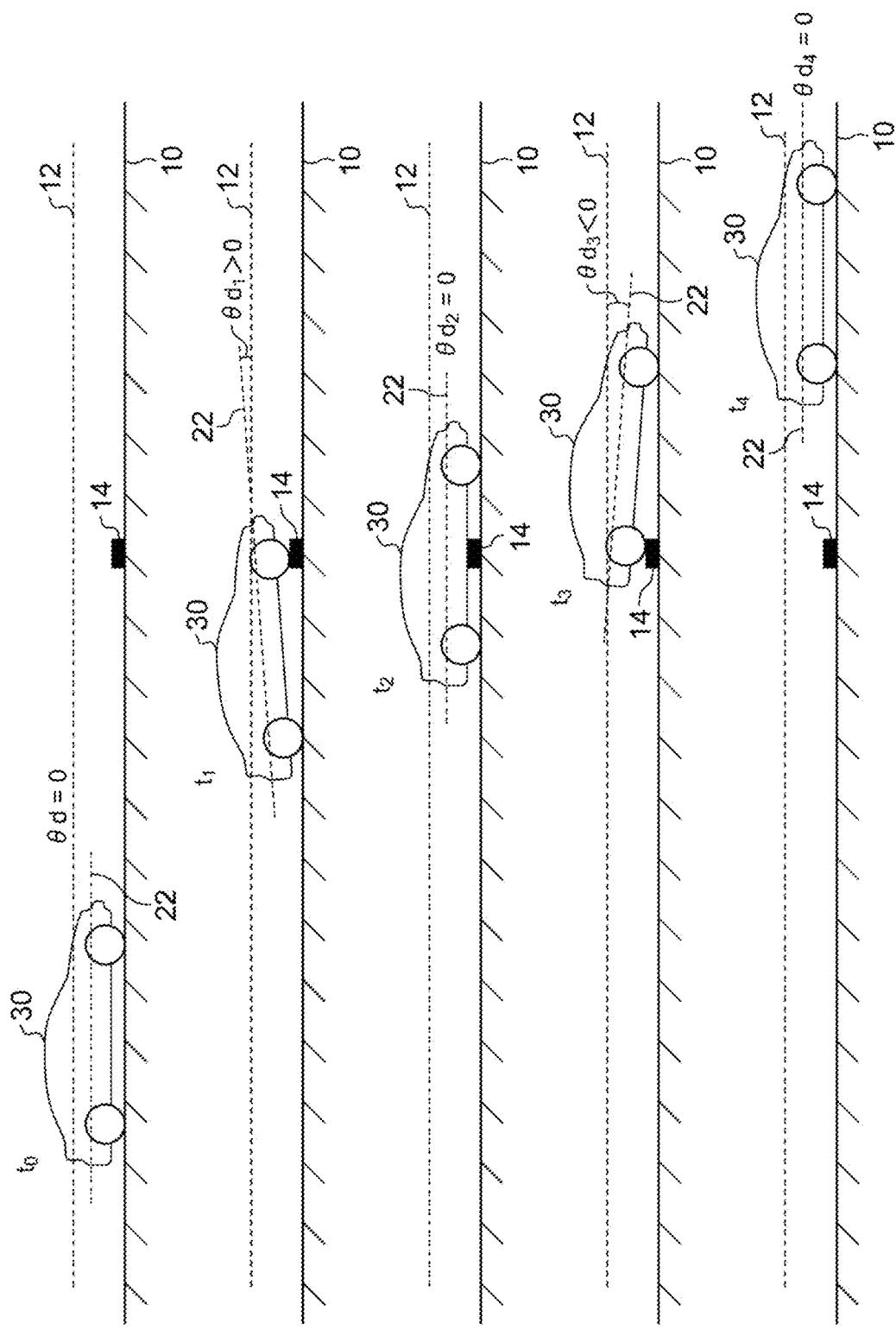
FIG. 4 is a diagram illustrating an example of a traveling scene of a vehicle.

FIG. 4 is a diagram illustrating an example of a traveling scene of the vehicle. In this example, an aspect in which a vehicle 30 travels from left to right in the drawing and gets over a step 14 on the road surface 10 is illustrated. FIG. 4 illustrates attitudes of the vehicle 30 at a plurality of times $t_0$ to $t_4$. Respective times $t_0$ to $t_4$ indicate the following states.

Time $t_0$: state of traveling in front of the step 14
Time $t_1$: state in which a front wheel rides on the step 14
Time $t_2$: state in which the front wheel climbs over the step 14
Time $t_3$: state in which a rear wheel rides on the step
Time $t_4$: state in which the rear wheel climbs over the step 14

The dynamic pitch angle θd at each of times to, $t_2$, and $t_4$ is 0. The dynamic pitch angle θd at time $t_1$ takes a positive value $θd_1$, and the dynamic pitch angle θd at time $t_2$ takes a negative value $θd_3$.

Figure 5:
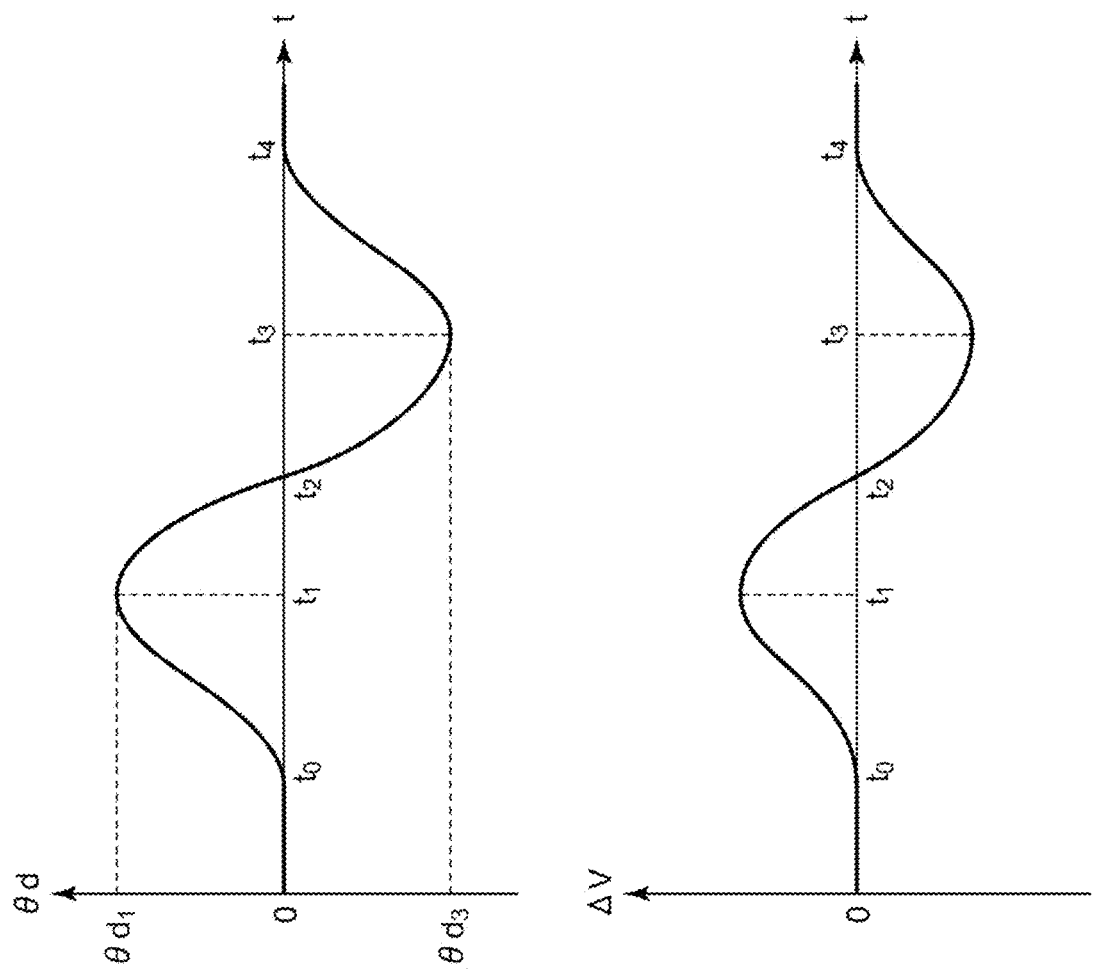
FIG. 5 is a diagram illustrating a waveform of a dynamic pitch angle θd and a waveform of the correction amount ΔV corresponding to the traveling scene of FIG. 4.

FIG. 5 is a diagram illustrating a waveform of the dynamic pitch angle θd and a waveform of the correction amount ΔV corresponding to the traveling scene of FIG. 4. As illustrated in FIG. 4, the dynamic pitch angle θd swings in a positive direction, then swings in a negative direction, and eventually returns to 0.

The correction amount ΔV is generated corresponding to the variation of the dynamic pitch angle θd.

FIG. 6 is a diagram illustrating a light beam corresponding to the cutoff line of the lamp light of the headlamp in the traveling scene of FIG. 4. By adaptive light distribution control following the dynamic pitch angle θd, the light beam 32 of the lamp light can be always maintained at a constant angle with respect to the road surface 10.

The operation of the lamp system 100 has been described above. According to the lamp system 100, as illustrated at time $t_1$ of FIG. 6, when the rear of the vehicle 30 sinks down, it is possible to prevent glare by lowering the cutoff line downward. In addition, as illustrated at time $t_3$ of FIG. 6, when the front of the vehicle 30 sinks down, it is possible to prevent a distant visual field from becoming dark by raising the cutoff line upward.

In addition, by performing this control following dynamic variation of the pitch angle θ of the vehicle body, even when the vehicle 30 vibrates (pitching) in the front-rear direction, the position of the cutoff line on the virtual vertical screen in front of the vehicle can be always kept constant, and it is possible to prevent an object in front of the vehicle from becoming bright or dark, and it is possible to provide an improved visual field.

The static pitch angle θs can be regarded as a reference value of the pitch angle θp, and the dynamic pitch angle θd can be regarded as a dynamic deviation of the pitch angle θp from the reference value. Therefore, the controller 200 controls the high-definition lamp unit 110 such that the angle formed by the light beam 32 corresponding to the cutoff line of the lamp light and the road surface 10 becomes constant according to the deviation Od.

Hereinafter, an example of the light distribution control following the fluctuation of the pitch angle θp by the controller 200 will be described.

Figure 7A:
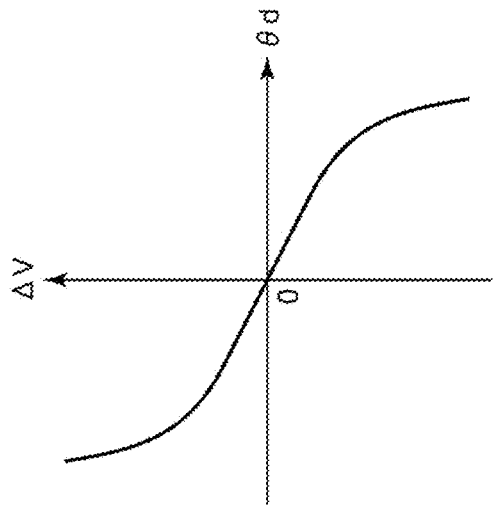
FIGS. 7A to 7C are diagrams illustrating examples of a relationship (control characteristic) between the dynamic pitch angle θd and the correction amount ΔV.
Figure 7B:
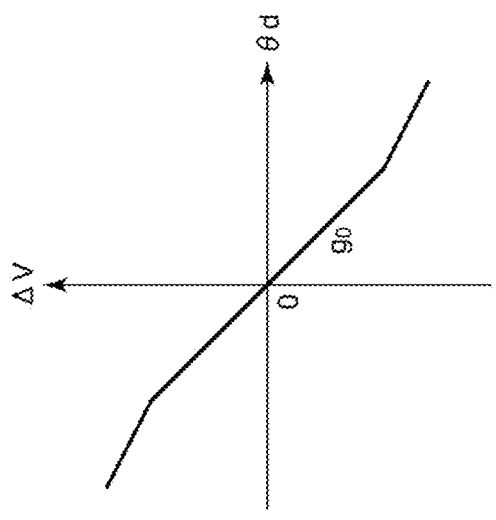
Figure 7C:
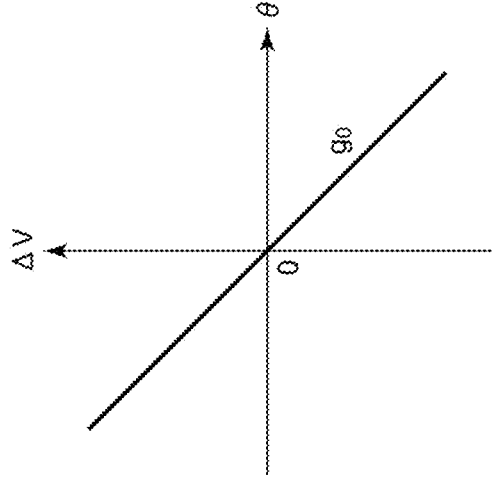

FIGS. 7A to 7C are diagrams illustrating examples of a relationship (control characteristic) between the dynamic pitch angle θd and the correction amount ΔV.

When the correction amount ΔV is set to the movement amount of the cutoff line CL on the virtual vertical screen, and a distance to the virtual vertical screen is set to L, Equation (1) may be satisfied.

$$\Delta V = L \times \tan\theta d \quad (1)$$

When θd≈0, tan θd≈θd, and thus Equation (2) is obtained.

$$\Delta V \approx L \times \theta d \quad (2)$$

Therefore, most simply, as illustrated in FIG. 7A, the correction amount ΔV can be defined as a linear expression having a proportional constant (referred to as reference gain $g_0$) based on the distance L with respect to the dynamic pitch angle θd. As described above, when image data to be supplied to the light emitting element array 112 is corrected, the boundary 116 corresponding to the cutoff line on the image data is shifted in the vertical direction so as to obtain the correction amount ΔV in FIG. 4. The shift amount Δy of the pixel at this time can be determined based on a design of an irradiation optical system 114, and a relationship of Δy=f (θd) is satisfied using a function f( ) obtained geometrically and optically. When the irradiation optical system 114 is a simple optical system, f( ) can be approximated by a linear function and can be expressed by Equation (3).

$$\Delta y = \alpha \cdot \theta d \quad (3)$$

When the irradiation optical system 114 is a complicated optical system including a reflecting mirror having a hyperbolic paraboloid, an elliptic paraboloid, a rotating paraboloid, and a free paraboloid, the correction amount ΔV may be defined by a polygonal line with respect to the dynamic pitch angle θd as illustrated in FIG. 7B.

Alternatively, even when a simple optical system is used, the control characteristic illustrated in FIG. 7B may be determined for the purpose of reducing the correction amount ΔV with respect to the unit variation amount of the dynamic pitch angle θd in a region where the variation amount (absolute value of Od) is large. In this case, it is possible to suppress glare when a control delay occurs in a situation where a nose-up attitude is obtained immediately after nose-dive.

When the irradiation optical system 114 is a complicated optical system including a reflector having an elliptic paraboloid or a free paraboloid, more complicated control characteristics may be determined as illustrated in FIG. 7C.

Movement of the cutoff line in the upward direction may be invalidated according to a traveling situation. For example, when the dynamic pitch angle θd includes a frequency component exceeding a response speed of the controller 200, it is possible to suppress glare by invalidating movement of the cutoff line in the upward direction.

Alternatively, movement of the cutoff line not only in the upward direction but also in the downward direction may be invalidated. When road surface unevenness is continuously generated (for example, 3 seconds or more in terms of time), it is assumed that the road surface is a special road surface (for example, a dirt course, an unpaved mountain road, etc.) different from normal road traveling. Therefore, when a steep pitch angle change continuously occurs for a predetermined time (for example, 3 seconds) or more, the pitch angle control may be fixed to pitch angle control acquired in a stop state or a stable traveling state. Further, at the time of returning, it is preferable not to immediately return, but to gradually return over several seconds. In the case of the high-definition lamp unit 110 capable of controlling the intensity distribution in multiple gradations, it is preferable to gradually return with blurring or gradation.

Vertical Asymmetry Control

A process of actively raising the optical axis upward at the time of the nose-dive brings about an effect that a far field of view can be maintained. On the other hand, when a control delay occurs or when there is an unexpected change in the road surface, there is a possibility that glare is given to surrounding traffic participants.

Figure 8:
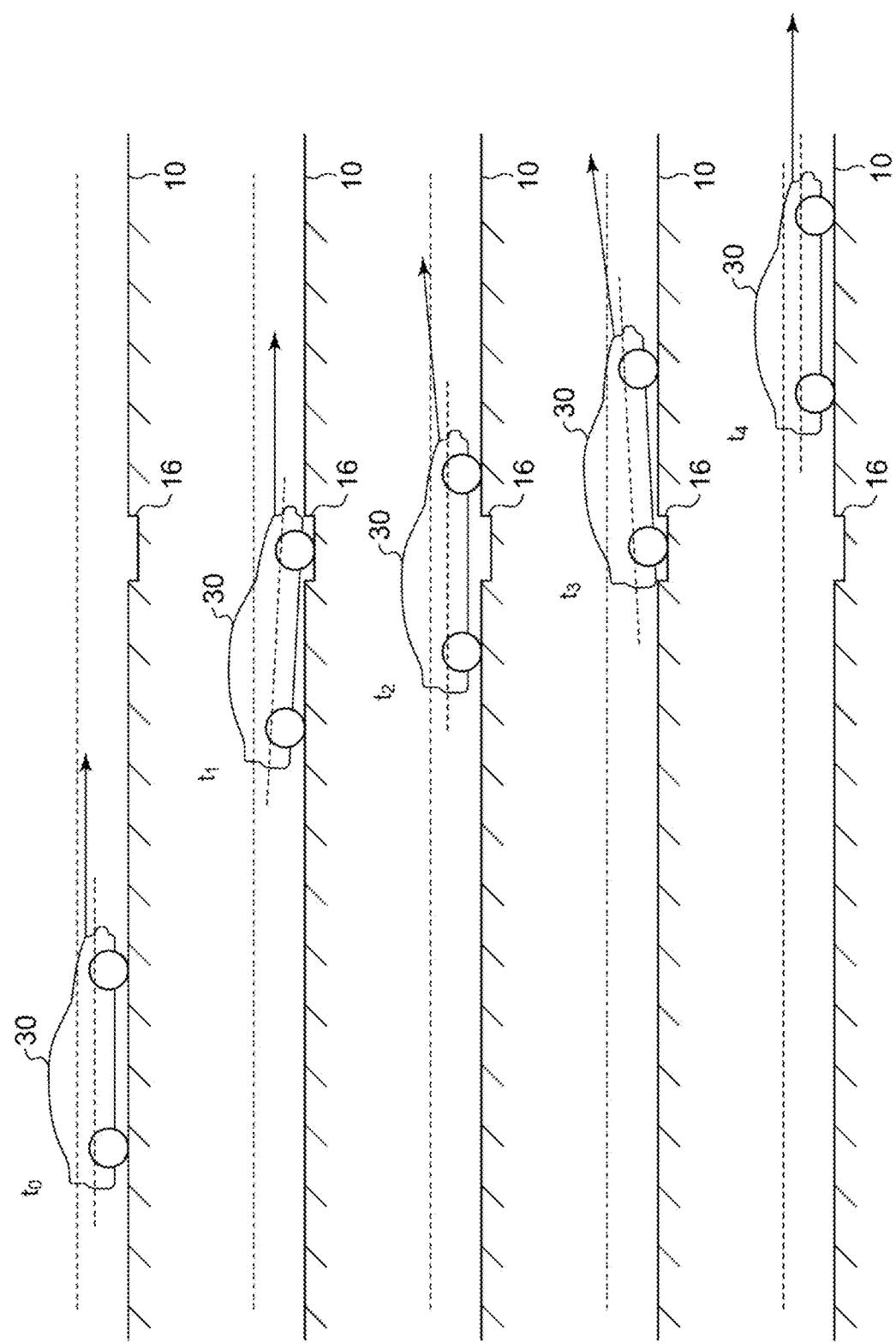
FIG. 8 is a diagram for describing glare that may occur as a result of optical axis correction in the case of nose-dive.

FIG. 8 is a diagram for describing glare that may occur as a result of optical axis correction in the case of nose-dive. In this example, an aspect in which the vehicle 30 travels from left to right in the drawing and passes through a recess 16 on the road surface 10 is illustrated. FIG. 4 illustrates attitudes of the vehicle 30 at a plurality of times $t_0$ to $t_4$. Respective times $t_0$ to $t_4$ indicate the following states.

Time $t_0$: state of traveling in front of the recess 16

Time $t_1$: state in which the front wheel falls into the recess 16

Time $t_2$: state in which the front wheel has finished passing through the recess 16

Time $t_3$: state in which the rear wheel falls into the recess 16

Time $t_4$: state in which the rear wheel has finished passing through the recess 16

When the nose-dive state is obtained at time $t_1$, the position of the cutoff line is corrected so that the optical axis faces upward. At the following time $t_2$, the attitude of the vehicle returns to an original attitude, and θd=0. In this instance, the controller 200 attempts to return the cutoff line to an original predetermined position $v_0$. However, when there is a control delay, the cutoff line does not completely return to the predetermined position $v_0$ and is located above the predetermined position $v_0$. As a result, the lamp light is emitted above a horizontal, and there is a possibility of giving glare.

Further, when the nose-up state is obtained at time $t_3$, the controller 200 attempts to correct the position of the cutoff line in the downward direction from the predetermined position $v_0$ such that the optical axis faces downward. Also in this case, when there is a control delay, the cutoff line does not completely fall down to a target position corresponding to a current attitude, so that the lamp light is emitted above the horizontal, and there is a possibility of giving glare.

The problem described with reference to FIG. 8 can be solved by vertical asymmetry control described below.

In the examples of FIGS. 7A to 7C, the control characteristic is the same between the case where the dynamic pitch angle θd is positive and the case where the dynamic pitch angle θd is negative, in other words, when the cutoff line CL moves in the upward direction from the predetermined position and when the cutoff line CL moves in the downward direction from the predetermined position. On the other hand, in the vertical asymmetry control, asymmetry corresponding to the sign (direction) of the dynamic pitch angle θd is introduced.

That is, the control characteristic of the cutoff line CL may be different between the case where the dynamic pitch angle θd is positive and the case where the dynamic pitch angle θd is negative, in other words, when the cutoff line CL moves in the upward direction from the predetermined position and when the cutoff line CL moves in the downward direction from the predetermined position. The control characteristic here is a relationship in which the dynamic pitch angle θd and the correction amount ΔV are associated with each other, and examples thereof include the above-described function f( ) and a parameter (gain and order) that defines the function f( ).

Figure 9A:
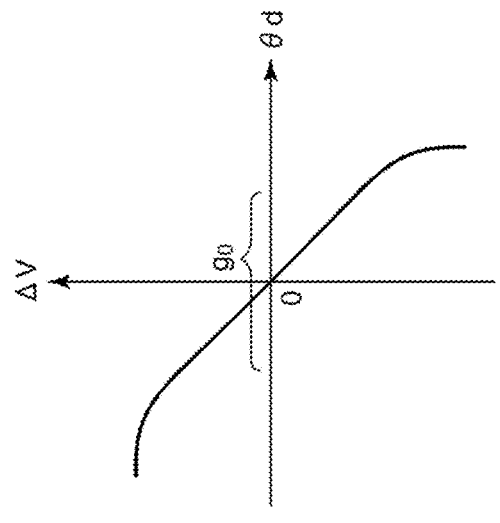
FIGS. 9A to 9C are diagrams illustrating examples of the relationship (control characteristic) between the dynamic pitch angle θd and the correction amount ΔV.
Figure 9B:
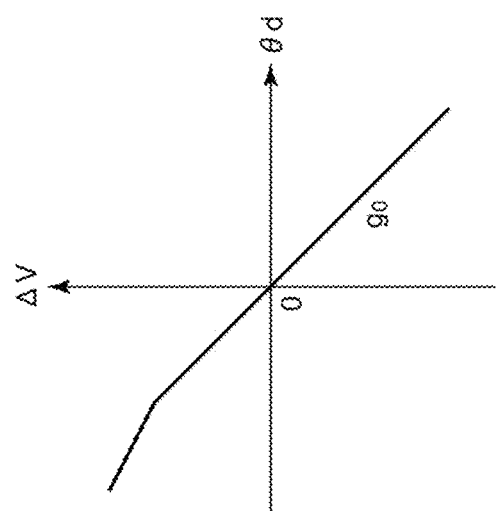
Figure 9C:
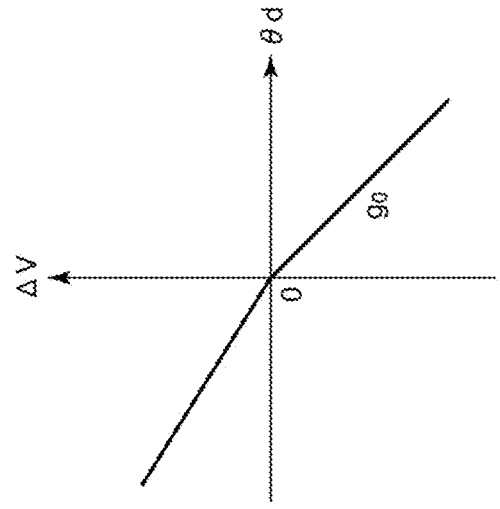

FIGS. 9A to 9C are diagrams illustrating examples of the relationship (control characteristic) between the dynamic pitch angle θd and the correction amount ΔV. In the example of FIG. 9A, as in FIG. 7A, the control characteristic is a linear function, but the gain (inclination) is different between when θd>0 (nose-up) and when θd<0 (nose-dive). In other words, with respect to the dynamic pitch angle θd having the same absolute value and a different sign, the correction amount ΔV may be relatively large when θd>0, and the correction amount ΔV may be relatively small when θd<0.

Specifically, in a region of θd>0, as shown in Equation (2), an inclination (reference gain $g_0$) based on a distance L is obtained. Thus, glare can be reliably prevented.

On the other hand, in a range of θd<0, the inclination is smaller than an inclination based on the reference gain $g_0$ when compared with θd>0. That is, in the case of nose-dive, the amount by which the optical axis is directed upward is suppressed. In this way, it is possible to suppress glare given to surrounding traffic participants when a control delay occurs in a situation where a nose-up attitude is obtained immediately after nose-dive. That is, the problem described with reference to FIG. 8 can be solved.

Figure 10:
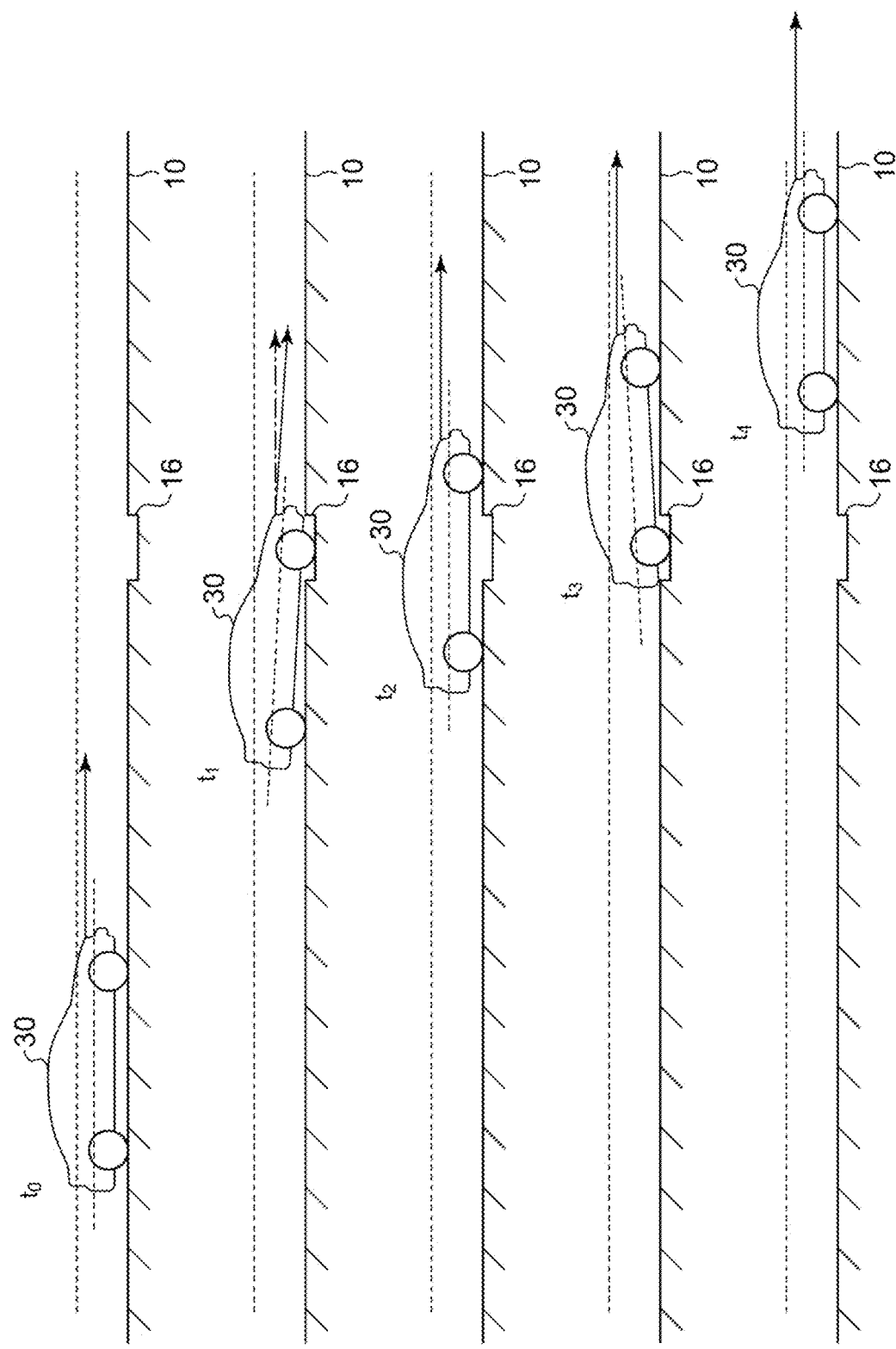
FIG. 10 is a diagram for describing optical axis correction based on the control characteristic of FIG. 9A.

FIG. 10 is a diagram for describing optical axis correction based on the control characteristic of FIG. 9A. FIG. 10 is obtained by applying the control characteristic of FIG. 9A to the same travel scene as in FIG. 8. When the nose-dive state is obtained at time $t_1$, the position of the cutoff line is corrected so that the optical axis faces upward. In this instance, since θd<0, the correction amount ΔV is smaller than the correction amount in the case of FIG. 8. An alternate long and short dash line is the optical axis in the case of FIG. 8, and a solid line is an optical axis based on the control characteristic of FIG. 9A.

At the following time $t_2$, the attitude of the vehicle returns to an original attitude, and θd=0. In this instance, the controller 200 attempts to return the cutoff line to an original predetermined position $v_0$. Since the correction amount ΔV at the time of the preceding nose-dive is reduced, the cutoff line returns to the predetermined position $v_0$ even when there is a control delay. As a result, the lamp light is maintained below the horizontal, and glare can be suppressed.

The description returns to FIG. 9B. In the example of FIG. 9B, a negative threshold value $\theta_{TH}$ is determined, and has a slope based on the reference gain $g_0$ in a range of θd>$\theta_{TH}$. On the other hand, in a range of θd<$\theta_{TH}$, the inclination is smaller than that based on the reference gain $g_0$.

Thus, in the case of shallow nose-dive, the optical axis is corrected with the reference gain, whereby a far field of view can be ensured. On the other hand, in the case of deep nose-dive, the amount by which the optical axis is directed upward is suppressed. In this way, it is possible to suppress glare given to surrounding traffic participants when a control delay occurs in a situation where a nose-up attitude is obtained immediately after nose-dive. That is, the problem described in FIG. 8 can be solved.

In the example of FIG. 9C, the inclination based on the reference gain $g_0$ is obtained in a region of θd≈0, but the inclination increases as the variation amount (absolute value) increases in a range of θd>0. As a result, the optical axis is directed downward more than the originally required amount in a large nose-up situation. Thus, the glare can be more reliably suppressed.

Conversely, in a range of d<0, the inclination decreases as the variation amount (absolute value) increases. As a result, the optical axis is directed upward less than the originally required amount in a deep nose-dive situation. In this way, it is possible to suppress glare given to surrounding traffic participants when a control delay occurs in a situation where a nose-up attitude changes immediately thereafter. That is, the problem described in FIG. 8 can be solved.

When a transfer function H(s) in which the dynamic pitch angle θd is input and the correction amount ΔV is output is considered as the control characteristic, the transfer function can include a filter element, and thus the characteristic of the filter may be different between when the cutoff line CL moves in the upward direction from the predetermined position and when the cutoff line CL moves in the downward direction from the predetermined position.

Figure 11A:
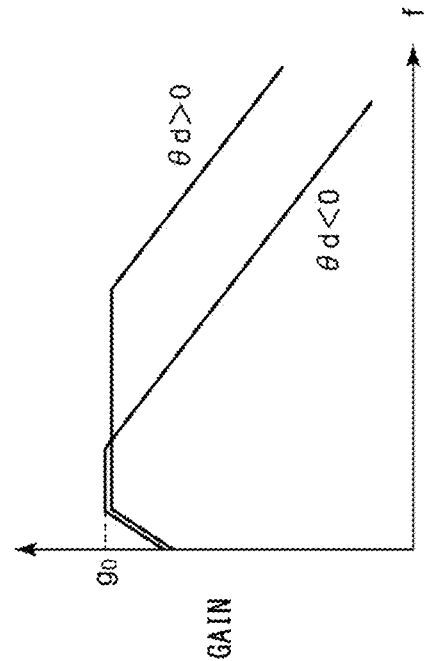
FIGS. 11A to 11D are diagrams illustrating examples of the relationship (control characteristic) between the dynamic pitch angle θd and the correction amount ΔV.

FIGS. 11A to 11D are diagrams illustrating examples of the relationship (control characteristic) between the dynamic pitch angle θd and the correction amount ΔV. In FIG. 11A, between when θd>0 and when θd<0, the frequency characteristic (cutoff frequency) is the same, and only the gain g is different.

Figure 11B:
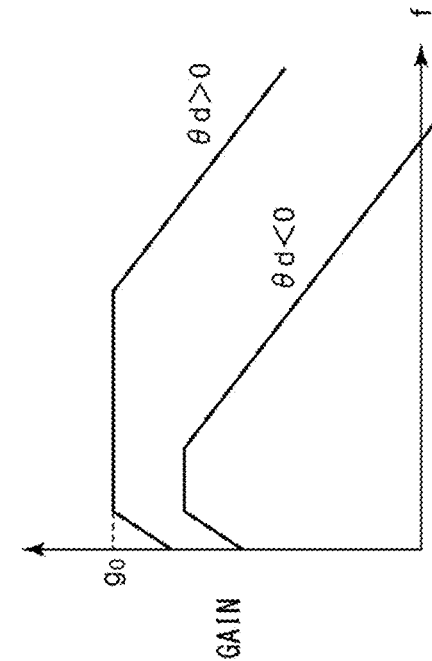

In FIG. 11B, between when θd>0 and when θd<0, the frequency characteristic is different even though the gain is the reference gain $g_0$ in either case. Specifically, when θd>0 (nose-up), a wide frequency band of the dynamic pitch angle θd is corrected to reliably prevent glare. When θd<0 (nose-dive), a frequency band of the dynamic pitch angle θd to be corrected is narrowed. This can reduce the risk of glare due to control delay.

Figure 11C:
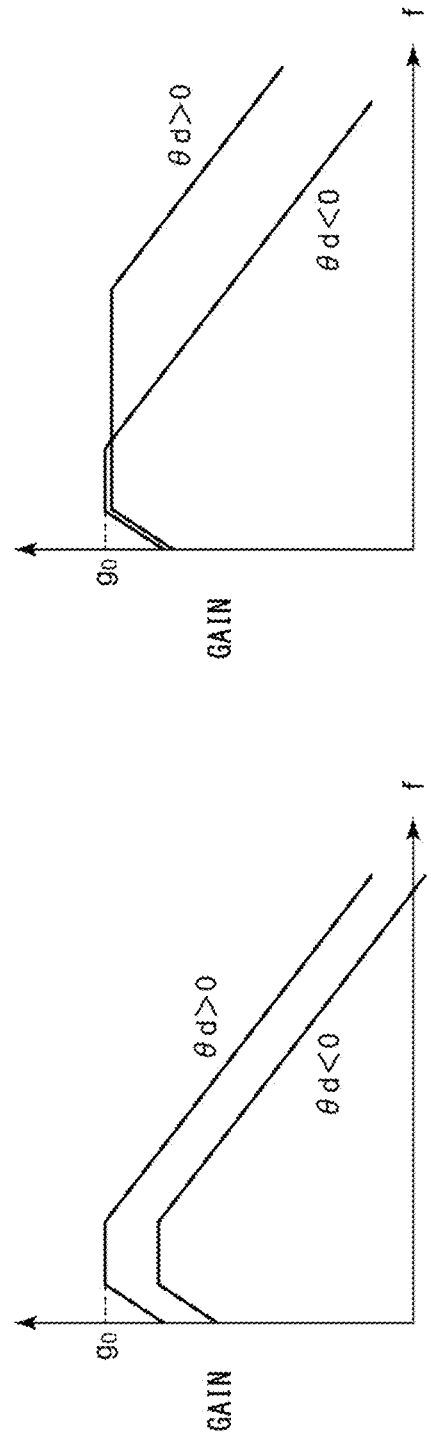

Similarly to FIG. 11B, in FIG. 11C, between when θd>0 and when θd<0, the frequency characteristic is different even though the gain is the reference gain $g_0$ in either case. In FIG. 11C, when θd<0 (nose-dive), the frequency band of the dynamic pitch angle θd to be corrected is narrowed, and the band to be corrected is on the broadband side when compared to the case of FIG. 11B.

Figure 11D:
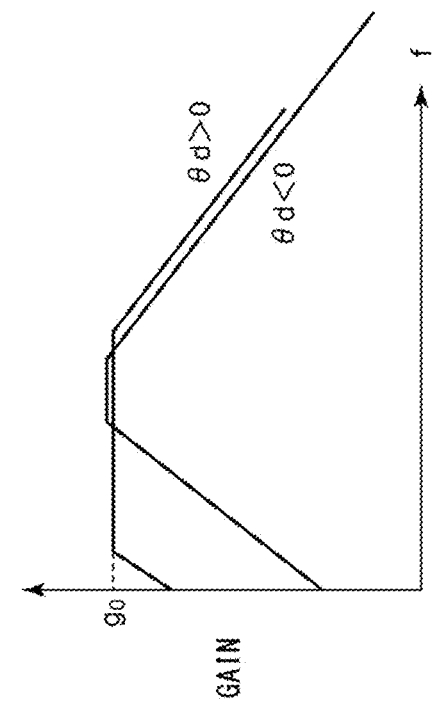

In FIG. 11D, both the gain g and the frequency characteristic are different between when θd>0 and when θd<0.

As another approach, a speed at which the cutoff line CL is moved up and down may be changed according to the attitude of the vehicle body. Specifically, a speed at which the cutoff line moves in the upward direction may be slower than a speed at which the cutoff line moves in the downward direction. As a result, it is difficult to provide glare after correcting the cutoff line CL in the upward direction.

Further, movement of the cutoff line in the upward direction may be invalidated according to a traveling situation. For example, when the dynamic pitch angle θd includes a frequency component exceeding a response speed of the controller 200, it is possible to suppress glare by invalidating movement of the cutoff line in the upward direction.

Alternatively, movement of the cutoff line not only in the upward direction but also in the downward direction may be invalidated. When road surface unevenness is continuously generated (for example, 3 seconds or more in terms of time), it is assumed that the road surface is a special road surface (for example, a dirt course, an unpaved mountain road, etc.) different from normal road traveling. Therefore, when a steep pitch angle change continuously occurs for a predetermined time (for example, 3 seconds) or more, the pitch angle control may be fixed to pitch angle control acquired in a stop state or a stable traveling state. Further, at the time of returning, it is preferable not to immediately return, but to gradually return over several seconds. In the case of the high-definition lamp unit 110 capable of controlling the intensity distribution in multiple gradations, it is preferable to gradually return with blurring or gradation.

When the high-definition lamp unit 110 can form a multi-gradation light distribution, the controller 200 may form an intensity distribution (illuminance distribution) of a light distribution in addition to movement of the cutoff line (leveling control).

Figure 12A:
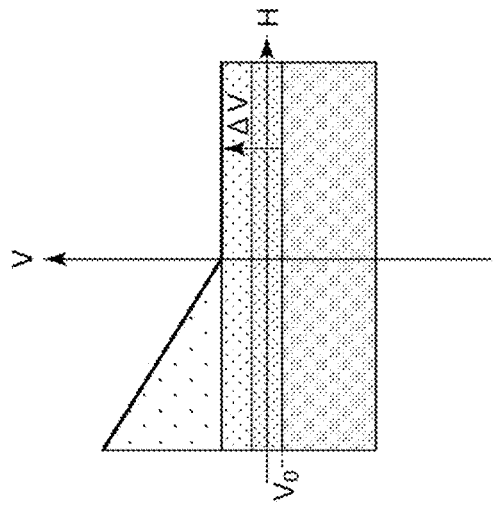
FIGS. 12A to 12C are diagrams for describing an example of control of the intensity distribution of the light distribution.
Figure 12B:
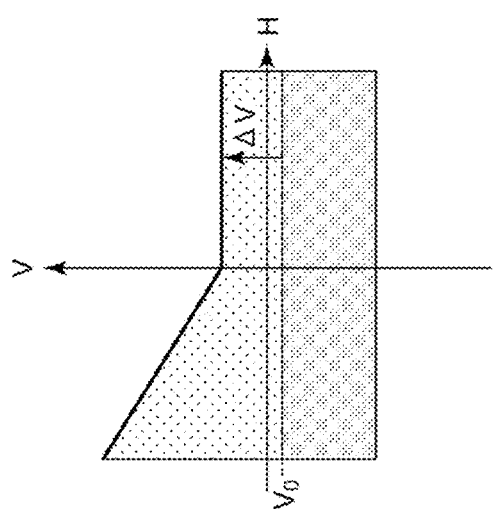
Figure 12C:
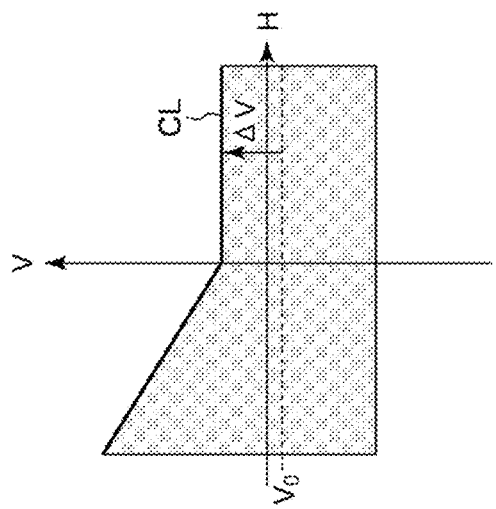

FIGS. 12A to 12C are diagrams for describing an example of control of the intensity distribution of the light distribution. FIG. 12A is an example of the most standard light distribution control, in which only the cutoff line CL is moved in the upward direction, and the illuminance is substantially constant. Note that, in FIGS. 12A to 12C, the illuminance is indicated by hatching density, and the higher the density, the higher the illuminance.

In the example of FIG. 12B, when the cutoff line CL is located above the predetermined position $v_0$, the controller 200 lowers the illuminance in a range above the predetermined position $v_0$ to be lower than the illuminance (prescribed value) in the case of FIG. 12A. As a result, glare can be less likely to occur while ensuring a far field of view of a driver.

In the example of FIG. 12C, when the cutoff line CL is located above the predetermined position $v_0$, the intensity distribution of the light distribution has gradation in which the illuminance in the range above the predetermined position $V_0$ gradually becomes darker toward the upper side. As a result, glare can be less likely to occur while ensuring a far field of view of a driver.

Modification 1

Modifications of the first embodiment will be described.

Modification 1.1

In the embodiment, the gyro sensor detects a dynamic component of a pitch angle, but the disclosure is not limited thereto. For example, the dynamic component of the pitch angle may be detected based on a combination of a front vehicle height sensor provided in a front suspension of the vehicle body and a rear vehicle height sensor provided in a rear suspension of the vehicle body.

Modification 1.2

In the embodiment, the high-definition lamp unit 110 includes the light emitting element array 112, but the disclosure is not limited thereto. For example, the high-definition lamp unit 110 may include a light source that generates light having a substantially flat intensity distribution, and a spatial light modulator that spatially patterns emitted light of the light source. Examples of the spatial light modulator include a digital micromirror device (DMD) and a liquid crystal device.

Modification 1.3

A method in which the controller 200 shifts the position of the cutoff line CL in the vertical direction is not limited to that described in the embodiment. For example, the light emitting element array 112 may have a pixel shift function. In this case, image data as a reference and the pixel shift amount $\Delta y$ may be given to the light emitting element array 112.

Modification 1.4

Control of the optical axis, that is, control of the height of the cutoff line is not limited to control by pixel control of the high-definition lamp unit 110 (electronic leveling). For example, a normal low beam unit may be configured to be controllable by a high-speed leveling actuator, and the height of the cutoff line may be controlled by changing an inclination of the low beam unit (referred to as mechanical leveling). Alternatively, the position of the light emitting element array 112 may be configured to be mechanically shiftable.

Second Embodiment

Figure 13:
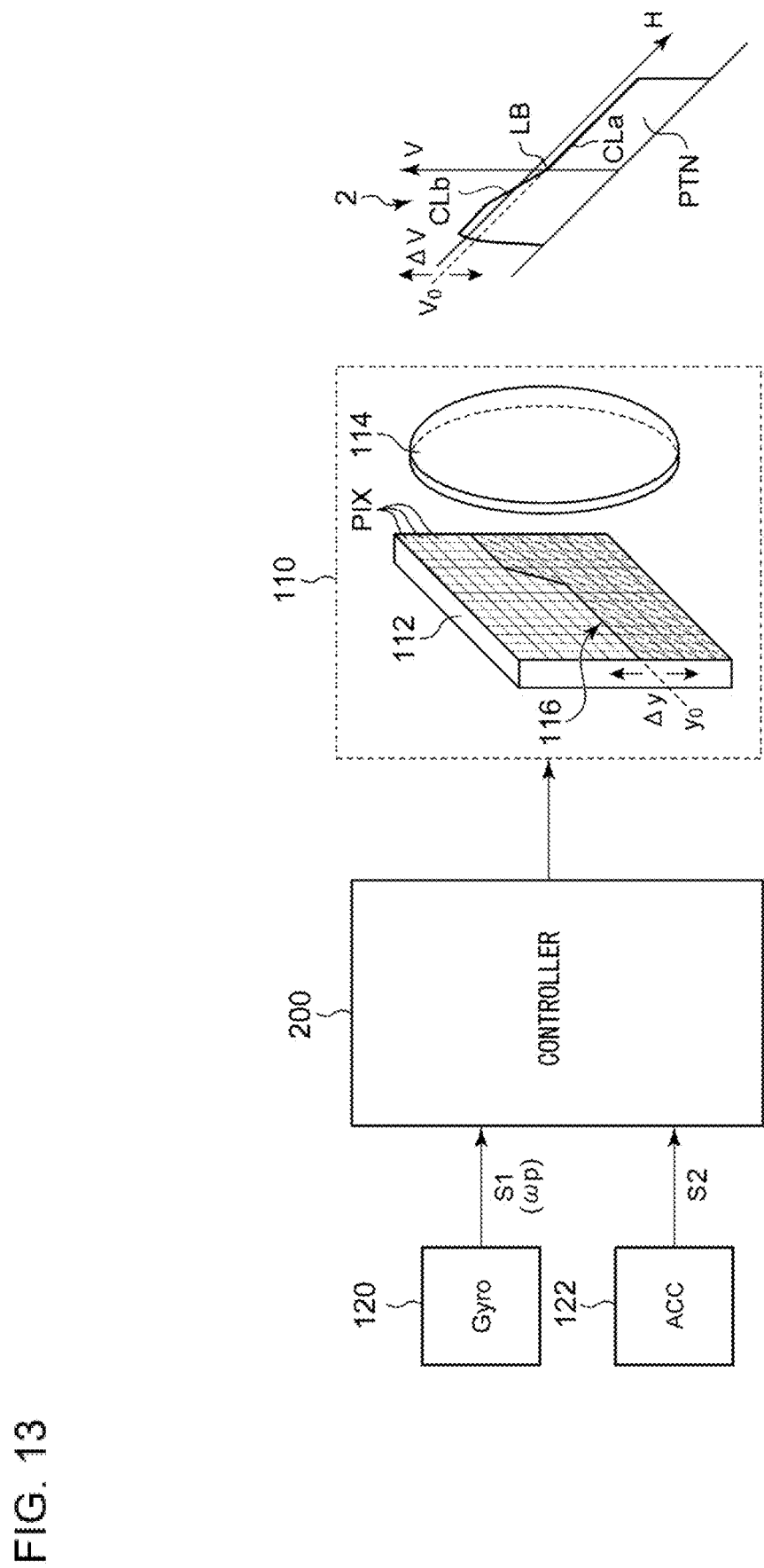
FIG. 13 is a block diagram of a lamp system according to a second embodiment.

FIG. 13 is a block diagram of a lamp system 100 according to a second embodiment. The lamp system 100 is a headlamp that is mounted on an automobile and irradiates a visual field in front of a vehicle. In the automobile, an inclination angle in a front-rear direction changes according to the front-rear weight balance. The inclination angle in the front-rear direction corresponds to rotation around a horizontal axis extending to the left and right of the vehicle body, and is referred to as a pitch angle θp.

The lamp system 100 has a function (auto leveling function) of automatically adjusting an optical axis of the headlamp in a pitch direction according to the pitch angle θp.

The lamp system 100 includes a high-definition lamp unit 110, a first sensor 120, a second sensor 122, and a controller 200.

In the present embodiment, the high-definition lamp unit 110 is a light distribution variable lamp configured to be able to irradiate a part or all of a low-beam region. The high-definition lamp unit 110 may cover a part/all of a high-beam region in addition to the part/all of the low-beam region. The high-definition lamp unit 110 includes a plurality of individually controllable pixels PIX, and emits lamp light having a light distribution corresponding to states of the plurality of pixels PIX. For example, the high-definition lamp unit 110 includes a light emitting element array 112 and an irradiation optical system 114. As the light emitting element array 112, an LED array can be used.

The luminance of each of the pixels PIX may be controllable in two gradations of ON and OFF, or may be controllable in multiple gradations. Further, when the control can be performed with two gradations of ON and OFF, each pixel PIX is switched at high speed, and a time ratio (duty cycle) between an ON time and tan OFF time is changed, so that the multi gradations may be expressed by PWM dimming.

The irradiation optical system 114 projects output light of the light emitting element array 112 to the front of the vehicle. The irradiation optical system 114 may be a lens optical system, a reflection optical system, or a combination thereof.

FIG. 13 illustrates a virtual vertical screen 2. It is assumed that the virtual vertical screen 2 is a coordinate system based on a road surface. A distance between the virtual vertical screen 2 and the vehicle (lamp) can be set to 10 m or 25 m. On the virtual vertical screen 2, a light distribution pattern PTN is formed by lamp light of the high-definition lamp unit 110. The light distribution pattern PTN is an intensity distribution of the lamp light on the virtual vertical screen 2, and is based on an ON and OFF pattern of each of the plurality of pixels PIX of the light emitting element array 112. Note that a correspondence between a position of a certain pixel and an irradiation region on the virtual vertical screen 2 corresponding to the pixel is determined by the irradiation optical system 114, and a mirror image relationship (left-right inversion), up-down inversion, or up-down and left-right inversion may be performed.

The light distribution pattern PTN includes a cutoff line CL. In this example, the light distribution pattern PTN includes a horizontal cutoff line CLa and an oblique cutoff line CLb, which intersect at an elbow point LB.

In the present embodiment, the controller 200 corrects an optical axis of a low beam in a pitch angle direction according to the variation of the pitch angle θp caused by various factors while the vehicle is stationary and traveling.

For example, the controller 200 changes an ON and OFF boundary 116 of the plurality of pixels PIX of the light emitting element array 112 in order to raise and lower the cutoff line CL on the virtual vertical screen 2. How many pixels of the boundary 116 are shifted with respect to a certain variation range of the pitch angle θp can be geometrically and optically determined. The shift amount of the pixels is set to Δy.

In the present embodiment, similarly to the first embodiment, the controller 200 performs dynamic leveling on a frequency component exceeding 0.5 Hz of the pitch angle variation that has been conventionally removed as noise.

Furthermore, in the present embodiment, the controller 200 corrects the optical axis according to the static pitch angle (stop vehicle attitude angle) es illustrated in FIG. 2A. Specifically, control is performed such that a lamp optical axis is directed downward with respect to a static load change of the stopped vehicle. This is referred to as static leveling. Static leveling has been performed in a conventional vehicle lamp using a G sensor (acceleration sensor) or a vehicle height sensor.

In order to perform static leveling and dynamic leveling, it is necessary to accurately detect high-speed variation of the pitch angle and static or low-speed variation thereof.

In the present embodiment, the first sensor 120 and the second sensor 122 are provided for accurate detection of the pitch angle θp.

The first sensor 120 is mainly provided so as to be able to detect a dynamic component θd of the pitch angle θp while the vehicle body is traveling. The first sensor 120 includes a gyro sensor. The gyro sensor is attached in any direction. Preferably, the gyro sensor is attached such that one detection axis of the gyro sensor faces left and right horizontal directions of the vehicle body, and a first detection signal S1 indicating an angular velocity op of rotational movement around the detection axis is generated. The gyro sensor may have three axes or one axis.

The second sensor 122 is an acceleration sensor (G sensor). The second sensor 122 outputs a detection signal S2 including accelerations $\alpha_x$, $\alpha_y$, and $\alpha_z$ with respect to three axes, respectively. During a stationary state or a constant velocity motion of the vehicle, a composite vector of the accelerations $\alpha_x$, $\alpha_y$, and $\alpha_z$ of the three axes is directed in a gravity direction. When the vehicle performs an acceleration motion, the composite vector of the accelerations $\alpha_x$, $\alpha_y$, and $\alpha_z$ of the three axes gives a composite vector of gravity and an acceleration vector of the vehicle body.

The first sensor 120 and the second sensor 122 may be six-axis sensors in which an acceleration sensor and a gyro sensor are integrated.

The controller 200 is an electronic control unit (ECU) in which functions related to optical axis correction are integrated, and performs processing related to static leveling and dynamic leveling. The controller 200 may be an ECU dedicated to leveling (also referred to as a leveling ECU), may be an ECU integrated with a controller having another function, and may be configured by being divided into a plurality of ECUs.

The function of the controller 200 may be realized by software processing, hardware processing, or a combination of software processing and hardware processing. Specifically, software processing is implemented by a combination of a processor (hardware) such as a central processing unit (CPU), a micro processing unit (MPU), or a microcontroller and a software program executed by the processor (hardware). The controller 200 may be a combination of a plurality of processors (microcontrollers).

Specifically, the hardware processing is implemented by hardware such as an application specific integrated circuit (ASIC), a controller IC, or a field programmable gate array (FPGA).

The controller 200 detects the pitch angle θp of the vehicle in accordance with the detection signal S1 generated by the first sensor 120 and the second detection signal S2 generated by the second sensor 122, and controls the height of the cutoff line of the light distribution in accordance with the pitch angle θp. As illustrated in FIGS. 2A and 2B, the pitch angle θp includes a static pitch angle θs (stopped vehicle attitude angle) and a dynamic pitch angle θp.

A configuration example and a process example of the controller 200 will be described.

Example 1

Figure 14:
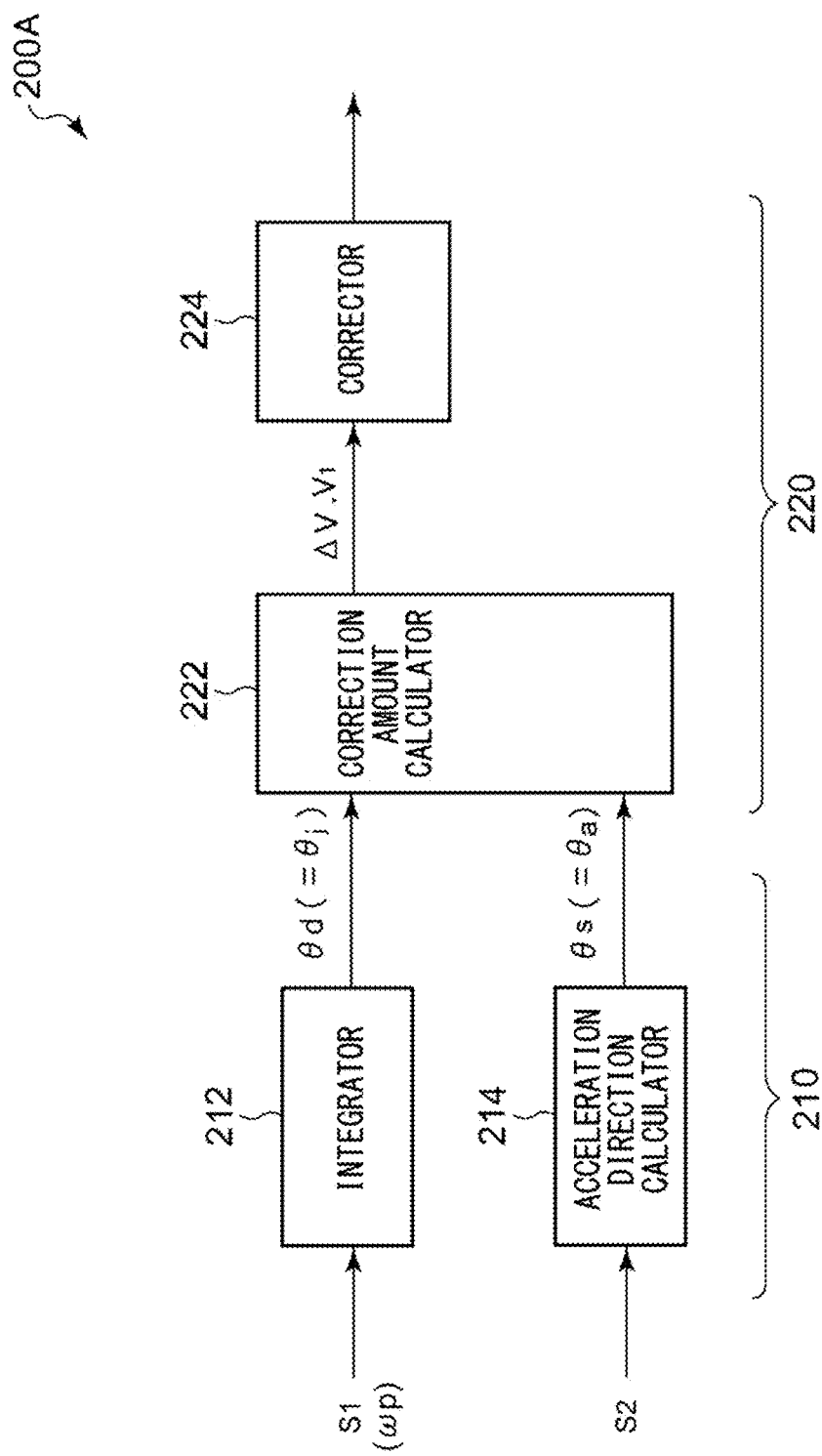
FIG. 14 is a functional block diagram of a controller according to Example 1.

FIG. 14 is a functional block diagram of a controller 200A according to Example 1. The controller 200A includes a pitch angle calculator 210 and a cutoff line controller 220.

The pitch angle calculator 210 generates angle information necessary for optical axis correction (leveling control), that is, the pitch angle θp, based on two detection signals S1 and S2.

The pitch angle calculator 210 includes an integrator 212 and an acceleration direction calculator 214. The integrator 212 calculates a first pitch angle θj by integrating an angular velocity ωp indicated by the first detection signal S1.

The acceleration direction calculator 214 calculates a second pitch angle θa indicating an acceleration direction α based on accelerations $\alpha_x$, $\alpha_y$, and $\alpha_z$ indicated by the second detection signal S2.

Figure 15:
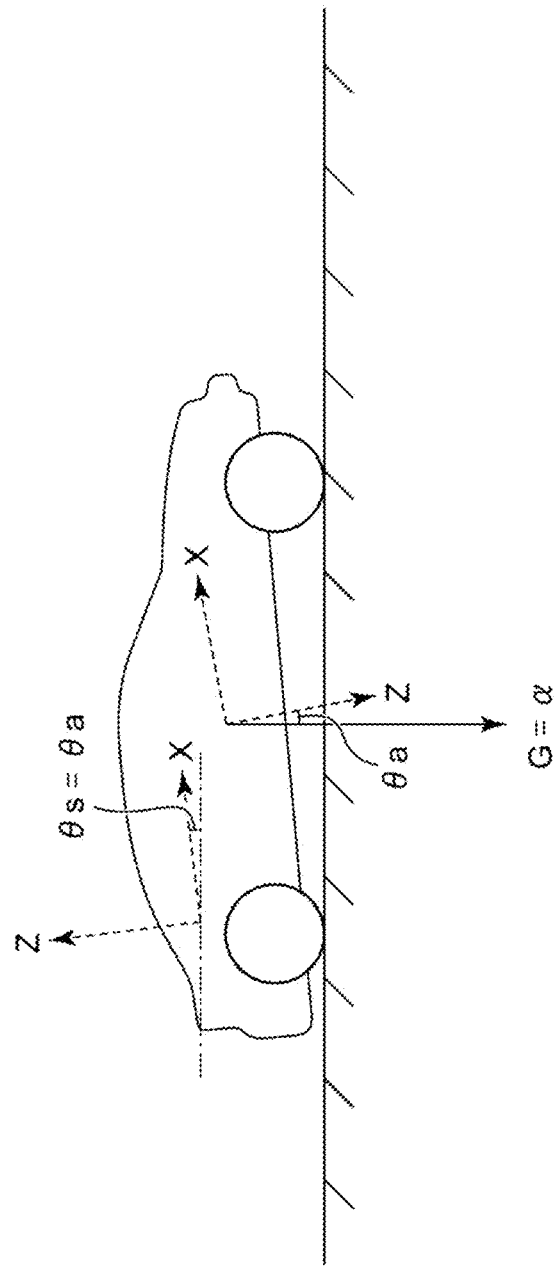

FIG. 15 is a diagram for describing a second pitch angle θa. A stopped time or constant velocity motion of the vehicle body will be considered. The acceleration direction α detected by the acceleration direction calculator 214 coincides with ta gravity direction G when the vehicle stops or is in constant velocity motion.

For easy understanding, it is assumed that x, y, and z axes of the acceleration sensor are parallel to X, Y, and Z axes of the vehicle body. It is assumed that the X axis of the vehicle body is directed in a traveling direction, the Y axis is directed in a left-right direction, and the Z axis is directed in an up-down direction. Further, for easy understanding, it is assumed that acceleration in a y-direction does not occur.

The second pitch angle θa is set to an angle formed by the z-axis of the acceleration sensor and the acceleration vector a. Then, the second pitch angle θa is an angle formed by a parallel straight line of the road surface and the X-axis of the vehicle body, and coincides with the static pitch angle θs illustrated in FIG. 2A.

The description returns to FIG. 14. The pitch angle calculator 210 can include a filter (a low-pass filter or a band-pass filter) in order to remove a noise component, but in order to correct high-speed pitch angle variation, a cutoff frequency may be determined so that a frequency component to be corrected can pass. Therefore, the cutoff frequency may be determined between a frequency of noise and a maximum frequency of a frequency to be corrected. For example, when the noise component around 100 Hz is large, the cutoff frequency needs to be determined so that 100 Hz can be sufficiently attenuated, and may be set to about ½ to ⅓ of 100 Hz that is the noise frequency, for example, 50 Hz.

In Example 1, the second pitch angle θa is associated with the static pitch angle θs, and the first pitch angle θj is associated with the dynamic pitch angle θd. Specifically, the static pitch angle θs (stopped vehicle attitude angle) can be estimated based on the second pitch angle θa when the vehicle is stationary. Since the acceleration sensor acquires a direction inclination of gravitational acceleration, it is impossible to distinguish whether a subject vehicle is inclined on a slope or inclined by a load even when the subject vehicle is stopped, but the stopped vehicle attitude angle (static pitch angle θs) can be estimated using a known technique.

In addition, the first pitch angle θj can be set as the dynamic pitch angle θd on the assumption that the stopped vehicle attitude angle (static pitch angle θs) does not change during traveling. For example, if the integral value is reset during a period in which the angular velocity ωp in the pitch direction is 0 and the integral is started when the angular velocity ωp becomes non-zero, the integral value indicates the dynamic pitch angle θd.

The cutoff line controller 220 performs static leveling based on the static pitch angle θs and performs dynamic leveling based on the dynamic pitch angle θp. For example, the cutoff line controller 220 controls the position $V_0$ serving as a reference of the cutoff line CL based on the static pitch angle θs. In addition, the cutoff line controller 220 shifts the cutoff line CL in the up-down direction with reference to the reference position $V_0$ based on the dynamic pitch angle θd.

Dynamic leveling may be applied only when the dynamic pitch angle θp based on the first pitch angle θj is larger than a predetermined threshold value.

Two methods are conceivable as leveling control by the cutoff line controller 220. One is a method of directly controlling the optical axis based on the pitch angle θp. This is referred to as collective control. In collective control, the position of the cutoff line CL may be set using the pitch angle θp as a control angle. In Example 1, the pitch angle θp can be generated by adding θj and θs.

Another method of leveling control is a method of controlling the optical axis by separating the static pitch angle θs and the dynamic pitch angle θd. This is referred to as separation control. Separation control will be described below.

The cutoff line controller 220 includes a correction amount calculator 222 and a corrector 224. In the case of separation control, the correction amount calculator 222 calculates a position $V_0$ serving as a reference of the cutoff line CL on the virtual vertical screen 2 based on the static pitch angle θs. In addition, the correction amount calculator 222 calculates the movement amount (correction amount ΔV) of the cutoff line CL in the up-down direction based on the dynamic pitch angle θd. In the present embodiment, the positive correction amount ΔV corresponds to the upward shift of the cutoff line CL, and the negative correction amount ΔV corresponds to the downward shift of the cutoff line CL. The corrector 224 controls the light emitting element array 112 so that the cutoff line CL moves from the reference position $V_0$ by the correction amount ΔV.

For example, the light emitting element array 112 has an interface using image data that designates ON and OFF (or luminance) of the plurality of pixels PIX as input. In this case, the corrector 224 may shift the position of the boundary 116 between an ON-pixel and an OFF-pixel included in the image data up and down by the number of pixels Δy corresponding to the correction amount ΔV. That is, the corrector 224 moves the position (boundary 116) of the cutoff line of the light distribution pattern included in the image data in the upward direction and the downward direction with respect to a predetermined position $y_0$ so as to cancel the dynamic component θd of the pitch angle θp. The predetermined position $y_0$ is a reference position corresponding to $V_0$.

In addition to the position (height) of the boundary 116 between the ON-pixel and the OFF-pixel corresponding to the cutoff line CL, the corrector 224 may shift the position (height) of the boundary between the ON-pixel and the OFF-pixel corresponding to the lower end of the light distribution pattern up and down by the number of pixels Δy corresponding to the correction amount ΔV. That is, the corrector 224 may shift the entire light distribution pattern up and down by the number of pixels Δy corresponding to the correction amount ΔV.

Example 2

A basic configuration of a controller according to Example 2 is similar to that in FIG. 14. In Example 2, the static pitch angle θs is determined based on the second pitch angle θa as in Example 1. That is, static leveling is similar to that in Example 1.

In Example 2, dynamic leveling is different from that in Example 1. Specifically, the dynamic pitch angle θd used in dynamic leveling is determined based on not only the first pitch angle θj but also variation of the second pitch angle θa.

Figure 16:
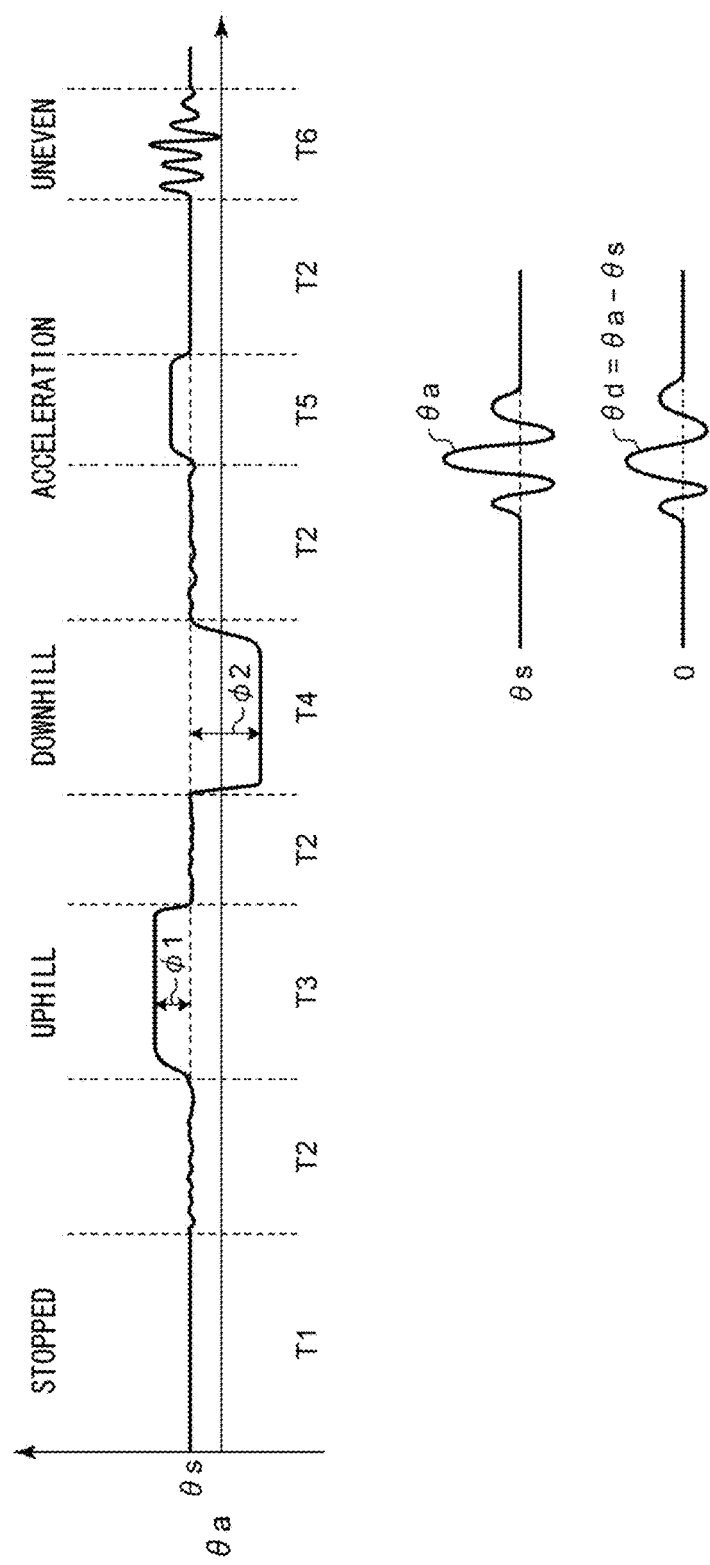
FIG. 16 is a diagram illustrating the second pitch angle θa sensed by the second sensor.

FIG. 16 is a diagram illustrating the second pitch angle θa sensed by the second sensor 122. A section T1 indicates that the vehicle is stopped on a road surface not having an inclination. The second pitch angle θa during stop of the vehicle indicates a static pitch angle (stopped vehicle attitude angle) θs.

A section T2 indicates traveling on a flat road. The second pitch angle θa slightly varies but is substantially constant.

A section T3 indicates an uphill having an inclination φ1. The second pitch angle θa is increased by σ1 from a stationary pitch angle θs. However, a change in the second pitch angle θa due to a slope does not affect the vehicle body attitude, and thus is irrelevant to the dynamic pitch angle θd, and leveling control does not occur.

A section T4 indicates a downhill having an inclination φ2. The second pitch angle θa is decreased by φ2 from the stationary pitch angle θs. However, a change in the second pitch angle θa due to a slope does not affect the vehicle body attitude, and thus is irrelevant to the dynamic pitch angle θd, and leveling control does not occur.

A section T5 indicates an acceleration period. This acceleration is normal acceleration and is distinguished from rapid acceleration described later. During the acceleration period, up-nose is obtained, and an attitude change occurs. As a result, the second pitch angle θa becomes larger than the stationary pitch angle θs.

The cutoff line controller 220 sets a variation range θa−θs of the second pitch angle da as the dynamic pitch angle θd, and corrects the optical axis based on the dynamic pitch angle θd. This is referred to as slow dynamic leveling.

In a section T6, the vehicle travels on an uneven road surface. During traveling on the uneven road surface, the second pitch angle θa vibrates around the static pitch angle θs. The cutoff line controller 220 sets a variation component θa−θs of the second pitch angle θa as the dynamic pitch angle θd, and moves the optical axis in the up-down direction based on the dynamic pitch angle θd. This is referred to as high-speed dynamic leveling.

Variation of the dynamic pitch angle θd during traveling on the uneven road surface is also detected as the first pitch angle θj. In this case, leveling control may be performed based on one of θj and (θa−θd). For example, when the second pitch angle θa is estimated to include noise, leveling control may be performed based on the first pitch angle θ$j$.

Alternatively, leveling control may be performed by averaging θj and (θa−θd).

Example 3

Figure 17:
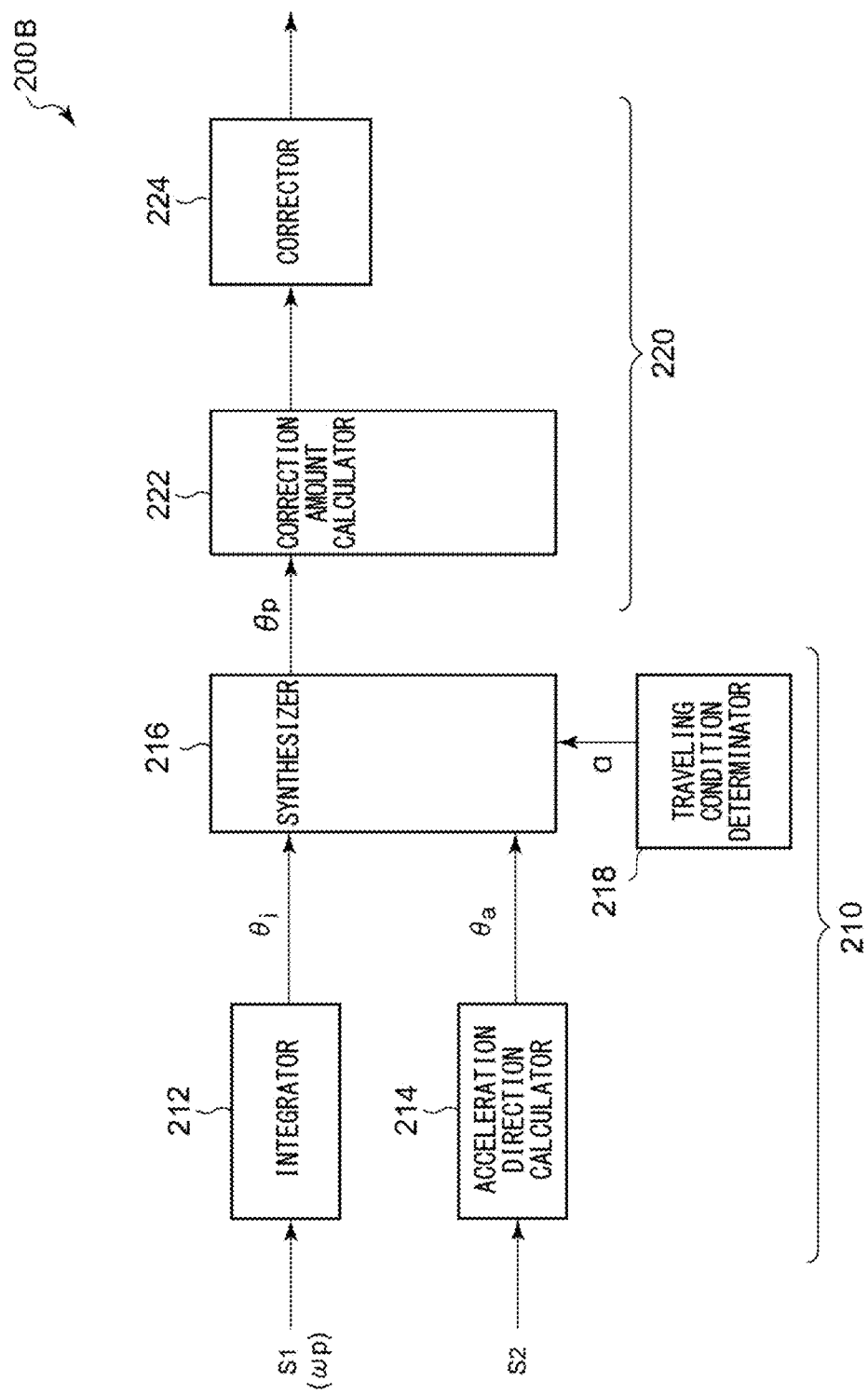
FIG. 17 is a functional block diagram of a controller according to Example 3.

FIG. 17 is a functional block diagram of a controller 200B according to Example 3. Similarly to FIG. 14, the controller 200B includes a pitch angle calculator 210 and a cutoff line controller 220.

The pitch angle calculator 210 includes a synthesizer 216 and a traveling condition determinator 218 in addition to the integrator 212 and the acceleration direction calculator 214. The synthesizer 216 synthesizes the first pitch angle θj and the second pitch angle θa to generate a pitch angle θp which is angle information necessary for optical axis correction (leveling control). As described above, the pitch angle θp includes the static pitch angle θs and the dynamic pitch angle θd.

The cutoff line controller 220 may perform collective control or separation control, but here, collective control is performed.

An example of processing in the synthesizer 216 will be described.

The synthesizer 216 weights and adds the first pitch angle θj and the second pitch angle θa to estimate the pitch angle θp using Equation (1).

$$\theta p = \alpha \cdot \theta j + \beta \cdot \theta a \quad (1)$$

For example, β=1−α may be satisfied, and synthesis in this case is expressed by Equation (2).

$$\theta p = \alpha \cdot \theta j + (1 - \alpha) \cdot \theta a \quad (2)$$

Here, the weighting coefficients α and β (=1−α) dynamically and adaptively change according to a travel environment (travel scene), a state of the vehicle, etc. (hereinafter, referred to as a traveling condition). The traveling condition determinator 218 determines the traveling condition based on information from the vehicle (referred to as vehicle information) and/or based on sensor information. Examples of the vehicle information include a vehicle speed, a steering angle, a camera image, map information, infrastructure information, suspension setting, vehicle weight, etc. The sensor information includes at least one of the first detection signal S1, the second detection signal S2, and the first pitch angle θj and the second pitch angle θa based on the first detection signal S1 and the second detection signal S2. Therefore, the weighting coefficient α can be set according to at least one of the vehicle information and the sensor information.

That is, when outputs of the first sensor 120 and the second sensor 122 continue to loosely change during normal traveling, leveling control based on output of the second sensor 122 is enabled. On the contrary, in the traveling condition in which the steep pitch angle variation is detected by the first sensor 120, leveling control based on the first pitch angle θj is enabled to follow the high-speed pitch angle variation.

A correspondence relationship between some traveling conditions and a weighting coefficient suitable therefor will be described.

(1) Passing Over Large Step or Unevenness

For example, it is assumed that the synthesizer 216 determines that the vehicle has passed over a large step based on at least one of the vehicle information and the sensor information. In this instance, α=1, and leveling control (dynamic leveling) may be performed based on the first pitch angle θj. Since the pitch angle variation associated with passing over the step includes a high-frequency component, it is considered that the gyro sensor has higher accuracy than that of a G-sensor. Therefore, by setting α=1, accurate dynamic leveling can be performed.

(2) Stop

When determining that the vehicle is stopped based on at least one of the vehicle information and the sensor information, the synthesizer 216 sets α=0 and calculates the pitch angle θp based on a second pitch angle θa. Since the pitch angle θp corresponds to the static pitch angle θs (vehicle attitude angle), static leveling is performed based on the static pitch angle θs.

(3) Flat Path

It can be considered that high-speed pitching variation hardly occurs during traveling on a flat road without unevenness. Therefore, while the vehicle is traveling on the flat road, α=about 0.1 to 0.5, and the pitch angle θp is calculated by increasing the weight of the acceleration sensor.

(4) Passing Over Small Step or Unevenness

A frequency of vibration caused by unevenness such as gravel is greater than 5 Hz, and may be, for example, 10 to 20 Hz. When traveling on small irregularities, there is a possibility that the correct pitch angle θj cannot be calculated even if output of the gyro sensor is integrated, and a situation in which leveling control cannot completely follow is assumed. Alternatively, even when the pitch angle based on integration of output of the gyro sensor is accurate, if leveling control is performed following the pitch angle, there is a possibility that inconvenience is given. Therefore, while the vehicle is traveling on the small irregularities, α=about 0.1 to 0.5, and the pitch angle θp is calculated by increasing the weight of the acceleration sensor. As a result, it is possible to regard a frequency greater than 5 Hz as noise and perform control based on an average without the noise, and it is possible to reduce botheration.

(5) Start of Slope (Start Ascending and Start Descending)

At start of a slope, α=0.5 to 1.0 can be set. In this case, since it is predicted that the pitch angle steeply changes, it is possible to perform high-speed dynamic leveling by increasing a to make an influence of the gyro sensor dominant.

(6) End Point of Slope (End of Ascending and End of Descending)

At an end point of the slope, α=0.5 to 1.0 can be set. In this case, since it is predicted that the pitch angle steeply changes, it is possible to perform high-speed dynamic leveling by increasing a to make an influence of the gyro sensor dominant.

(7) Middle of Slope

Since the pitch angle θp is considered to be stable in the middle of the slope, x=0.1 to 0.5 is preferably set.

(8) Rapid Acceleration/Rapid Deceleration

In the case of rapid acceleration and rapid deceleration, $\alpha=0.5$ to 1.0 can be set. In this case, since high-speed variation of the pitch angle $\theta p$ may occur, the weight of the gyro sensor can be increased, and dynamic leveling corresponding to dynamic pitch angle variation can be performed.

An operation of the lamp system 100 according to the second embodiment is similar to that described in the lamp system 100 according to the first embodiment. According to the lamp system 100 of the second embodiment, by the combination of the first sensor 120 and the second sensor 122, it is possible to distinguish and detect a static attitude change of the vehicle body (static change of the pitch angle) due to the number of passengers, the weight of baggage, the weight of fuel, etc., an inclination of the road surface on which the vehicle is traveling, and a steep change in the pitch angle due to unevenness and undulation present on the road surface. By controlling the light distribution according to the property of the detected pitch angle, it is possible to suppress glare associated with steep vehicle body vibration during traveling.

Modification 2

Modifications of the second embodiment will be described.

Modification 2.1

The second sensor 122 may use a vehicle height sensor instead of the acceleration sensor. The vehicle height sensor may be only a rear vehicle height sensor, or may be a hybrid of a rear vehicle height sensor and a front vehicle height sensor.

Modification 2.2

In the embodiment, the high-definition lamp unit 110 includes the light emitting element array 112, but the disclosure is not limited thereto. For example, the high-definition lamp unit 110 may include a light source that generates light having a substantially flat intensity distribution, and a spatial light modulator that spatially patterns emitted light of the light source. Examples of the spatial light modulator include a digital micromirror device (DMD) and a liquid crystal device.

Modification 2.3

A method in which the controller 200 shifts the position of the cutoff line CL in the vertical direction is not limited to that described in the embodiment. For example, the light emitting element array 112 may have a pixel shift function. In this case, image data as a reference and the pixel shift amount $\Delta y$ may be given to the light emitting element array 112.

Modification 2.4

Control of the optical axis, that is, control of the height of the cutoff line is not limited to control by pixel control of the high-definition lamp unit 110 (electronic leveling). For example, a normal low beam unit may be configured to be controllable by a high-speed leveling actuator, and the height of the cutoff line may be controlled by changing an inclination of the low beam unit (referred to as mechanical leveling). Alternatively, the position of the light emitting element array 112 may be configured to be mechanically shiftable.

Alternatively, electronic leveling and mechanical leveling may be combined. In this case, electronic leveling may be applied to variation of the steep pitch angle, and mechanical leveling may be applied to changes in the gradual or static pitch angle.

Modification 2.5

In the embodiment, control for actively directing the optical axis upward when the vehicle body is inclined forward (nose-dive) during traveling of the vehicle has been described, but the application of the disclosure is not limited thereto. Control for directing upward is limited to static leveling, and in dynamic leveling, only control for directing downward may be performed without performing control for directing the optical axis upward.

Alternatively, control for directing the optical axis upward is limited to static leveling and low-speed dynamic leveling, and in high-speed dynamic leveling, only control for directing the optical axis downward may be performed without performing control for directing the optical axis upward.

Layout

Figure 18:
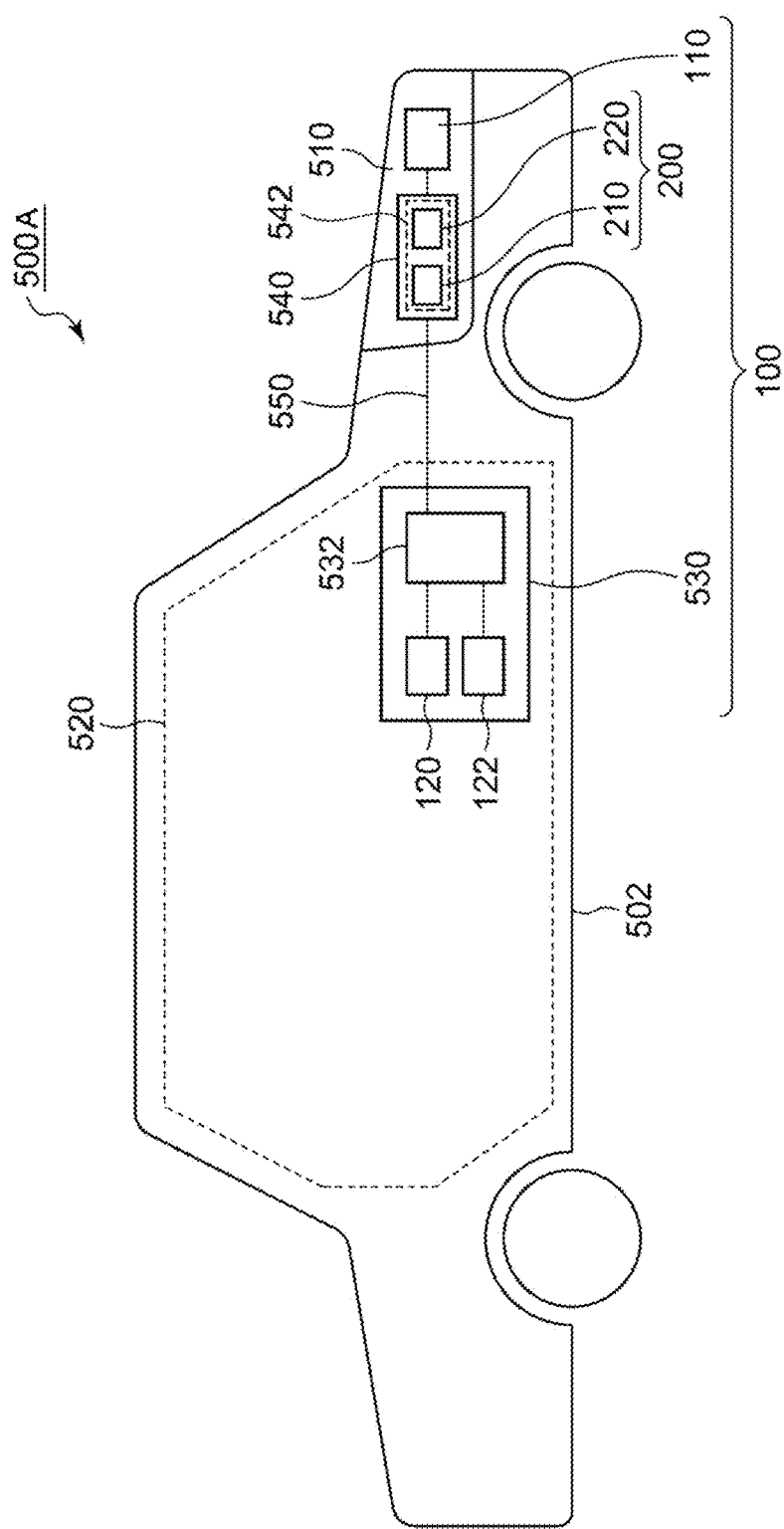
FIG. 18 is a diagram illustrating an example of a design of a vehicle including the lamp system.

FIG. 18 is a diagram illustrating an example of a design of a vehicle 500A including the lamp system 100. As described in the second embodiment, the lamp system 100 includes a high-definition lamp unit 110, a controller 200, a first sensor 120, and a second sensor 122.

The high-definition lamp unit 110 is incorporated in a headlamp 510A. Meanwhile, the first sensor 120 which is a gyro sensor and the second sensor 122 including an acceleration sensor or a vehicle height sensor are provided in a vehicle interior 504.

As illustrated in FIG. 3, the controller 200 includes a pitch angle calculator 210 and a cutoff line controller 220. The pitch angle calculator 210 and the cutoff line controller 220 are mounted as the same hardware (calculation processor) on the headlamp 510A side. Specifically, the pitch angle calculator 210 and the cutoff line controller 220 are mounted in a second calculation processor 542 provided on the headlamp 510A side, that is, outside the vehicle interior 504 (inside an engine room). The second calculation processor 542 may be a part of a unit referred to as a control module 540. The control module 540 may include a power supply circuit, etc. that supplies power to the high-definition lamp unit 110, in addition to the second calculation processor 542. A first calculation processor 532 and the second calculation processor 542 may each be a microcontroller including a software-controllable CPU.

The first sensor 120 and the first calculation processor 532 are unitized, which is referred to as a leveling ECU 530. When the second sensor 122 is an acceleration sensor, the second sensor 122 can also be incorporated in the leveling ECU 530. The first sensor 120 and the second sensor 122 may be a six-axis sensor 124 in which a gyro sensor and an acceleration sensor are integrated.

The first calculation processor 532 inside the vehicle interior 504 and the second calculation processor 542 outside the vehicle interior 504 are connected via a vehicle bus 550 such as a CAN or another interface.

In the design of FIG. 18, the first calculation processor 532 supplies an angular velocity signal based on the first detection signal S1 generated by the first sensor 120 to the second calculation processor 542 without change. That is, the second calculation processor 542 has a function as an interface of the vehicle bus 550.

The second calculation processor 542 integrates the angular velocity signal, converts the angular velocity signal into pitch angle information (first pitch angle $\theta j$), and controls the high-definition lamp unit 110 based on the first pitch angle $\theta j$.

An example of the design of the lamp system 100 has been described above. Advantages of this design will be described.

The headlamp 510A can be relatively easily attached to and detached from a vehicle body 502 when compared with other parts of the automobile, and a positional relationship between the headlamp 510A and the vehicle body 502 is expected to have a certain degree of error. Here, in a configuration in which the first sensor 120, which is a gyro sensor, is incorporated in the headlamp 510A or externally attached to the headlamp 510A, accuracy of detection of variation in the pitch angle θ decreases depending on the accuracy of assembly of the headlamp 510A to the vehicle body 502. In order to improve the detection accuracy, some calibration is required.

Further, the interior of the engine room in which the headlamp 510A is provided is in a severe environment, and is easily affected by a temperature change and a humidity change. When the gyro sensor is disposed on the headlamp side, that is, in the engine room, output of the gyro sensor is affected by the environment, and there is a possibility that the detection accuracy of the variation in the pitch angle is reduced.

In the configuration of FIG. 18, the first sensor 120 that is a gyro sensor is separated from the headlamp 510A and disposed in the vehicle interior 504, so that an error in a positional relationship between the vehicle body 502 and the gyro sensor can be reduced, and temperature variation of the gyro sensor can be suppressed. As a result, the detection accuracy of the variation in the pitch angle can be enhanced.

Figure 19:
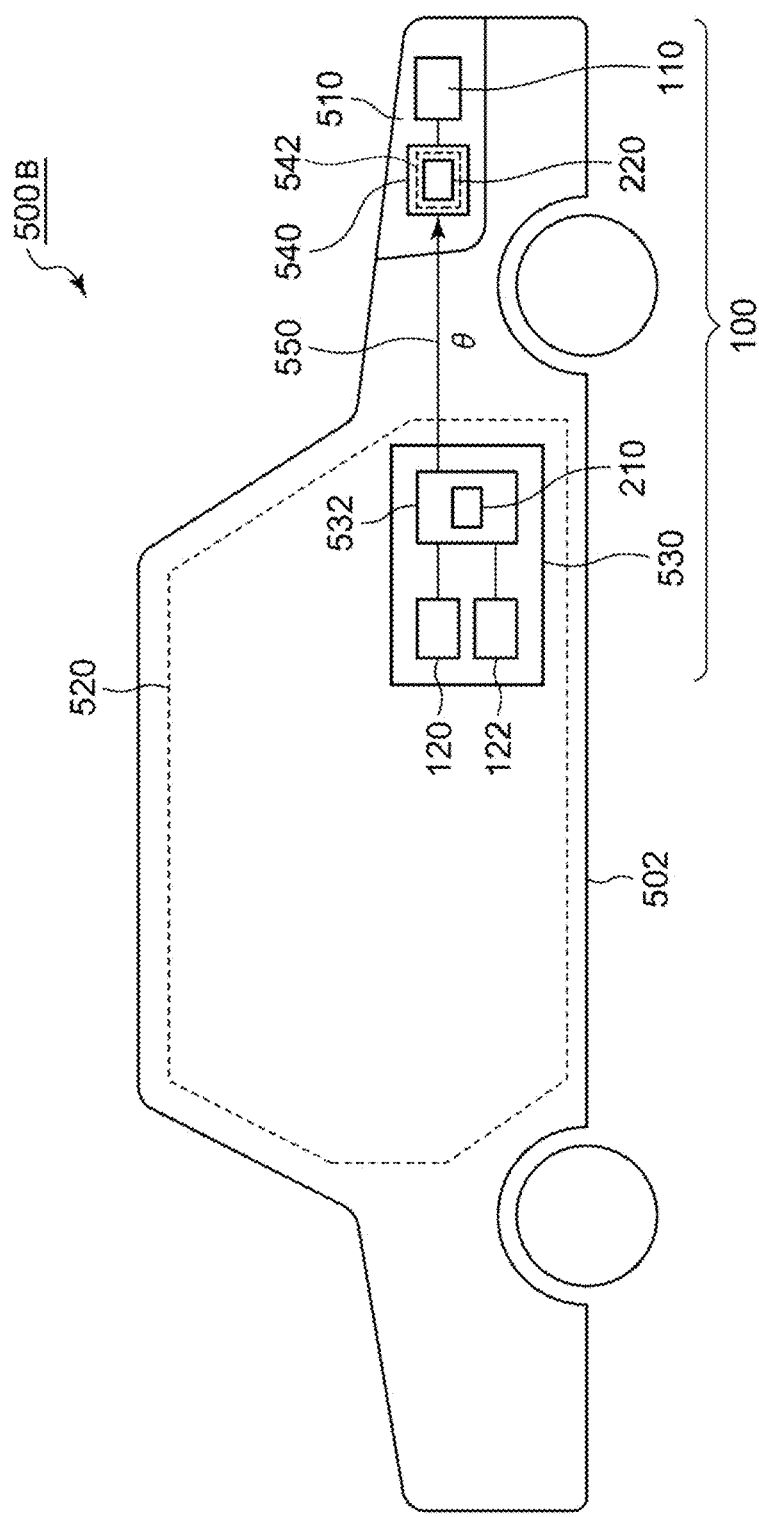
FIG. 19 is a diagram illustrating another example of a design of a vehicle including the lamp system.

FIG. 19 is a diagram illustrating another example of a design of a vehicle 500B including the lamp system 100.

In this example, the pitch angle calculator 210 and the cutoff line controller 220 are mounted as separate calculation processing devices. Specifically, the pitch angle calculator 210 is mounted in the first calculation processor 532 in the vehicle interior 504, and the cutoff line controller 220 is mounted in the second calculation processor 542 on a headlamp 510B side.

The cutoff line controller 220 of the first calculation processor 532 integrates an angular velocity signal that is output of the first sensor 120, and calculates the first pitch angle θj. Furthermore, the cutoff line controller 220 calculates the second pitch angle θa based on output of the second sensor 122. The first calculation processor 532 transmits pitch angle information θ based on the first pitch angle θj and the second pitch angle θa to the second calculation processor 542. The pitch angle information θ may include both the first pitch angle θj and the second pitch angle θa, or may be information obtained by combining the first pitch angle θj and the second pitch angle θa.

The second calculation processor 542 corresponding to the cutoff line controller 220 controls the high-definition lamp unit 110 based on the pitch angle information θ.

According to the design of FIG. 19, similarly to the design of FIG. 18, the first sensor 120 that is a gyro sensor is separated from the headlamp 510B and disposed in the vehicle interior 504, so that an error in a positional relationship between the vehicle body 502 and the gyro sensor can be reduced, and temperature variation of the gyro sensor can be suppressed. As a result, the detection accuracy of the variation in the pitch angle can be enhanced.

The design of FIG. 19 has the following advantages over the design of FIG. 18. Problem that may occur in the design of FIG. 18 will be described.

Figure 20:
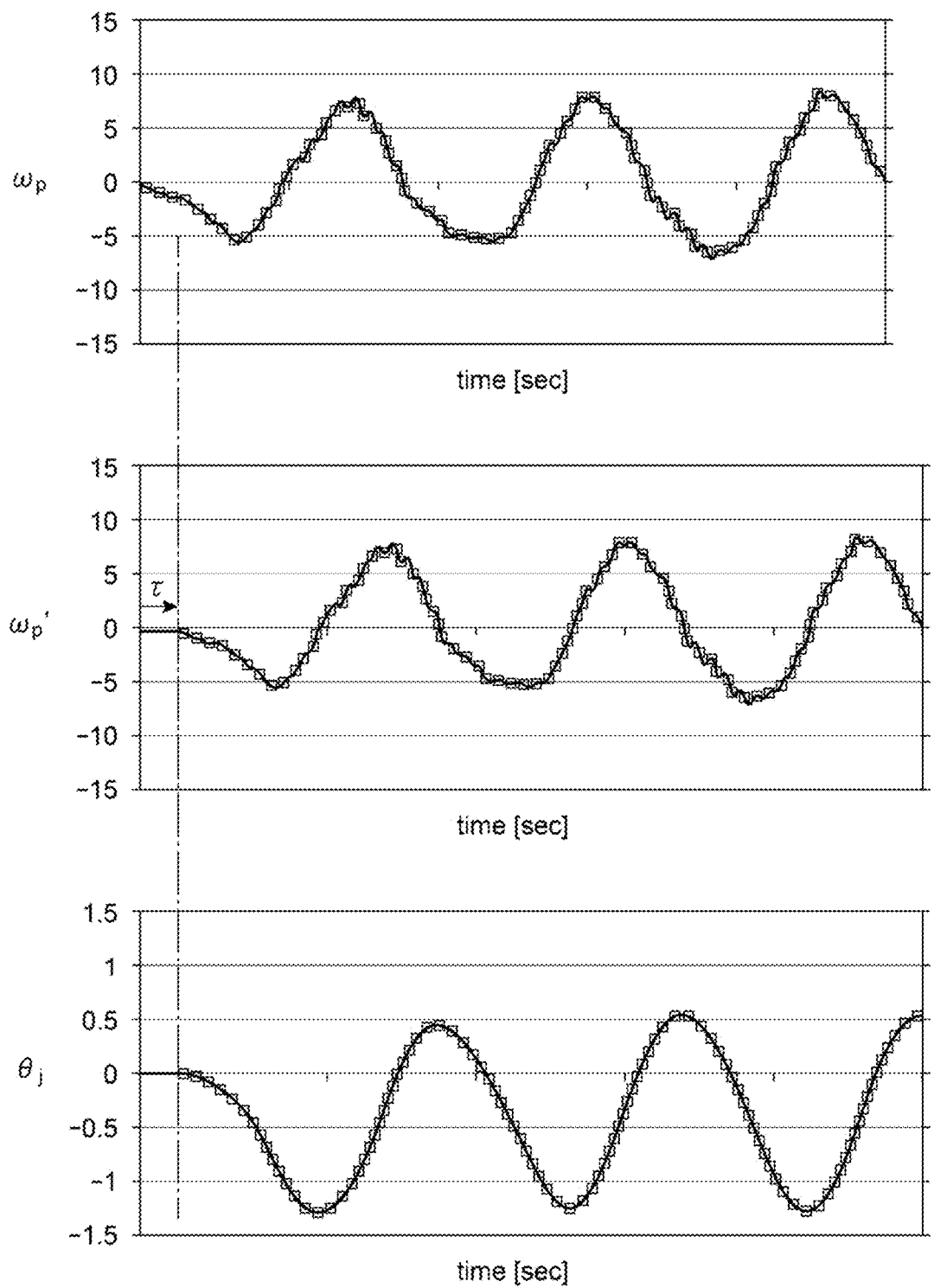
FIG. 20 is a diagram for describing signal transmission and processing in the design of FIG. 18.

FIG. 20 is a diagram for describing signal transmission and processing in the design of FIG. 18. An angular velocity signal ωp which is output of the gyro sensor is generated at a predetermined sampling rate (For example, 1 kHz, that is, 1 ms cycle). Therefore, the amount of data of the angular velocity signal ωp increases, and a transmission delay τ occurs when the angular velocity signal ωp is transmitted from the first calculation processor 532 to the second calculation processor 542 via the vehicle bus 550.

The second calculation processor 542 receives the delayed angular velocity signal ωp' via the vehicle bus 550. Then, the angular velocity signal ωp' is integrated and converted into the first pitch angle θj. When a delay of calculation processing is ignored, the first pitch angle θj is delayed by a time t with respect to the original angular velocity signal ωp. That is, a transmission delay τ on the vehicle bus 550 limits a response speed of the lamp system 100. It is difficult to employ a conventional CAN to increase the response speed, and it is necessary to employ the vehicle bus 550 having a small transmission delay τ, which causes an increase in cost.

It is sufficient to reduce the amount of data transmission to reduce the transmission delay τ, and measures such as thinning out sampling of the angular velocity signal ωp can be taken. However, in this case, an error of the pitch angle θj obtained by integrating the angular velocity signal ωp increases. In other words, accuracy of leveling control decreases.

Figure 21:
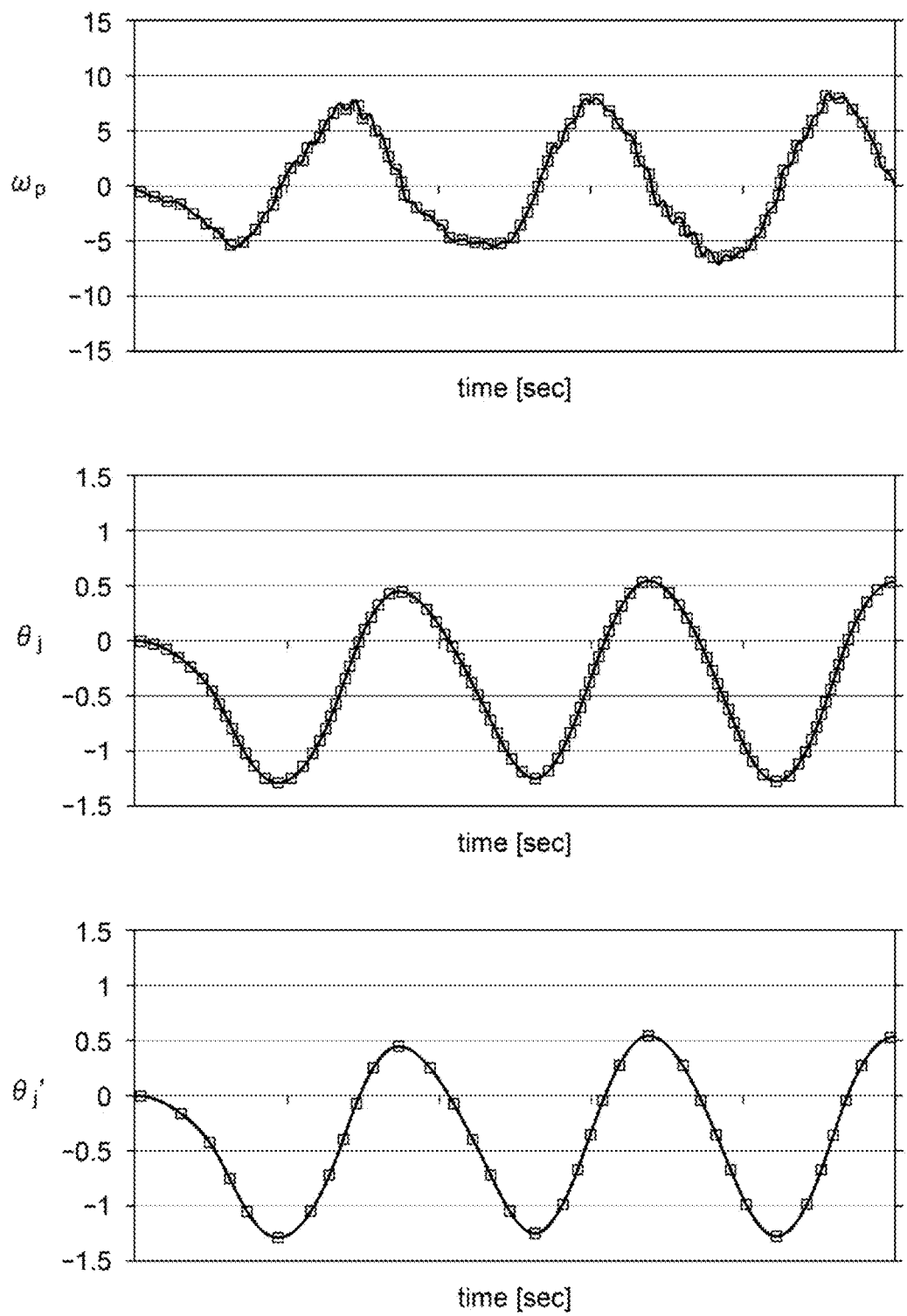
FIG. 21 is a diagram for describing signal transmission and processing in the design of FIG. 19.

FIG. 21 is a diagram for describing signal transmission and processing in the design of FIG. 19. In the design of FIG. 19, processing of integrating the angular velocity signal ωp and converting the angular velocity signal ωp into the first pitch angle θj is performed in the first calculation processor 532 in the vehicle interior. Therefore, at this stage, an influence of the transmission delay does not occur, and when the calculation delay is ignored, the first pitch angle θj can be calculated substantially in real time or with a significantly small delay. The first calculation processor 532 transmits a first pitch angle θj' based on the first pitch angle θj to the second calculation processor 542 via the vehicle bus 550.

A speed (update rate) at which the second calculation processor 542 updates the light distribution of the high-definition lamp unit 110 may be about several tens Hz to 100 Hz (For example, 60 fps, 16.6 ms cycle). That is, the first pitch angle θj may be supplied to the second calculation processor 542 at a rate of about several tens Hz to 100 Hz (for example, 60 fps, 16.6 ms cycle). In other words, the first calculation processor 532 does not need to transmit all samples of the calculated first pitch angle θj to the second calculation processor 542, and may transmit a down-sampled first pitch angle θj' to the second calculation processor 542. In this case, the number of samples, that is, the amount of data, to be transmitted over the vehicle bus 550 can be reduced when compared to the design of FIG. 18. As a result, the transmission delay in the vehicle bus 550 can be shortened. In other words, the design of FIG. 19 can employ the vehicle bus 550 with a slower transmission rate than that of the design of FIG. 18.

Prediction of Pitch Angle Variation

In the design of FIG. 19, the influence of the transmission delay τ is larger as a frequency of the variation of the pitch angle is higher, that is, as a period of vibration is shorter. Therefore, an influence of a propagation delay can be ignored at about 1 Hz, but a response delay may become a problem for high-frequency (for example, 2 to 5 Hz) vibration. Hereinafter, technique for further improving the response speed of the lamp system 100 will be described.

The first calculation processor 532 generates a future predicted value $\hat{θj}$ of the first pitch angle θj based on output of the first sensor 120. In the case of the transmission delay τ on the vehicle bus 550, the predicted value $\hat{θj}$ is preferably a predicted value after a time $(t_1+τ)$ that is τ ahead of a current time $t_1$. A method of predicting the first pitch angle θj is not particularly limited.

Figure 22:
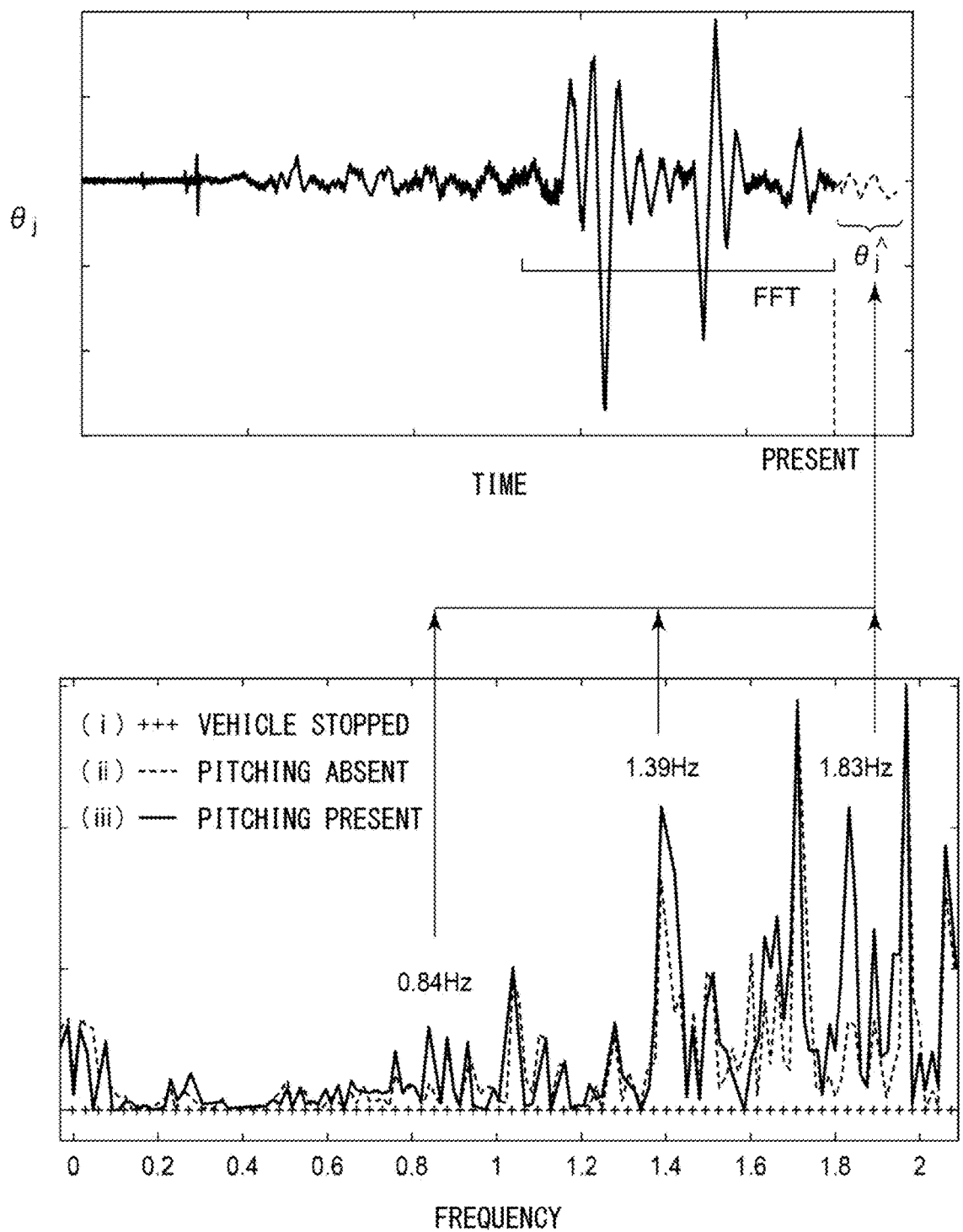
FIG. 22 is a diagram for describing prediction of a first pitch angle θj based on FFT.

For example, the first calculation processor 532 may predict the first pitch angle θj using fast Fourier transform (FFT). FIG. 22 is a diagram for describing prediction of the first pitch angle θj based on FFT. An example of a time waveform of the first pitch angle θj is illustrated in an upper part of FIG. 22.

The first calculation processor 532 converts a time waveform of the first pitch angle θj up to the present into spectrum information in the frequency domain. Spectra of the first pitch angle θj obtained in three states are illustrated in a lower part of FIG. 22. More specifically, spectra of three states of (i) a stopped state, (ii) a state where pitching does not occur during traveling, and (iii) a state where pitching occurs during traveling are illustrated. (ii) The state in which pitching does not occur is a state in which the vehicle travels on a flat road without a step or irregularities of a road surface, and corresponds to a situation in which optical axis correction is unnecessary. (iii) The state in which pitching occurs is a state in which the vehicle travels on a step or irregularities of a road surface, and corresponds to a situation in which optical axis correction is necessary. As illustrated in (ii), even when traveling on a flat road surface, the spectrum includes several frequency components. As illustrated in (iii), when pitching occurs, a specific frequency component becomes larger than that of the spectrum of (ii). In the example of FIG. 22, 0.84 Hz, 1.39 Hz, and 1.83 Hz can be estimated as pitching that requires optical axis correction. The first calculation processor 532 can generate a future predicted value θĵ in the time domain of the first pitch angle θj from a specific frequency component.

For generation of the future predicted value θĵ of the first pitch angle θj, an algorithm of time-series prediction of waveform data using deep learning can also be used.

The second calculation processor 542 performs leveling control based on the actually measured current first pitch angle θj and the future predicted value θĵ of the first pitch angle. The second calculation processor 542 may synthesize (for example, perform weighted addition) the two pitch angles θj and θĵ to generate a pitch angle θj*, and perform leveling control based on the pitch angle θj*.

The second calculation processor 542 may normally perform leveling control based on the actually measured first pitch angle θj, and reflect the predicted value θĵ in the leveling control when the predicted value θĵ indicates a large value.

Since the predicted value θĵ is not necessarily accurate, when leveling correction is performed based on an erroneous negative predicted value θĵ, the optical axis is corrected upward, and thus there is concern that glare may be given. Therefore, the second calculation processor 542 may reflect the predicted value θĵ in leveling control when the predicted value θĵ indicates a positive value (nose-up), and may not reflect the predicted value θĵ in leveling control or relatively reduce a ratio of contribution to leveling control as compared to the case where predicted value θĵ is positive when the predicted value θĵ indicates a negative value (nose-dive).

When generating the predicted value θĵ, the first calculation processor 532 may generate an index indicating accuracy of the predicted value. In this case, the second calculation processor 542 may perform leveling control based on the predicted value θĵ when accuracy is high, and may ignore the predicted value θĵ when accuracy is low.

As described above, by using the predicted value θĵ of the first pitch angle, it is possible to reduce the influence of the transmission delay and the delay of the signal processing and to follow the pitch angle variation at a higher speed.

Modifications of the layout will be described. In the configuration of FIG. 18, the first sensor 120, which is a gyro sensor, is separated from the headlamp 510A and disposed in the vehicle interior 504, but the position of the gyro sensor is not limited to the inside of the vehicle interior 504. For example, the first sensor 120, which is a gyro sensor, may be disposed at a position independent of the headlamp 510A in the engine room. As a result, an error in a positional relationship between the vehicle body 502 and the gyro sensor can be reduced.

Structure of Headlamp

Figure 23:
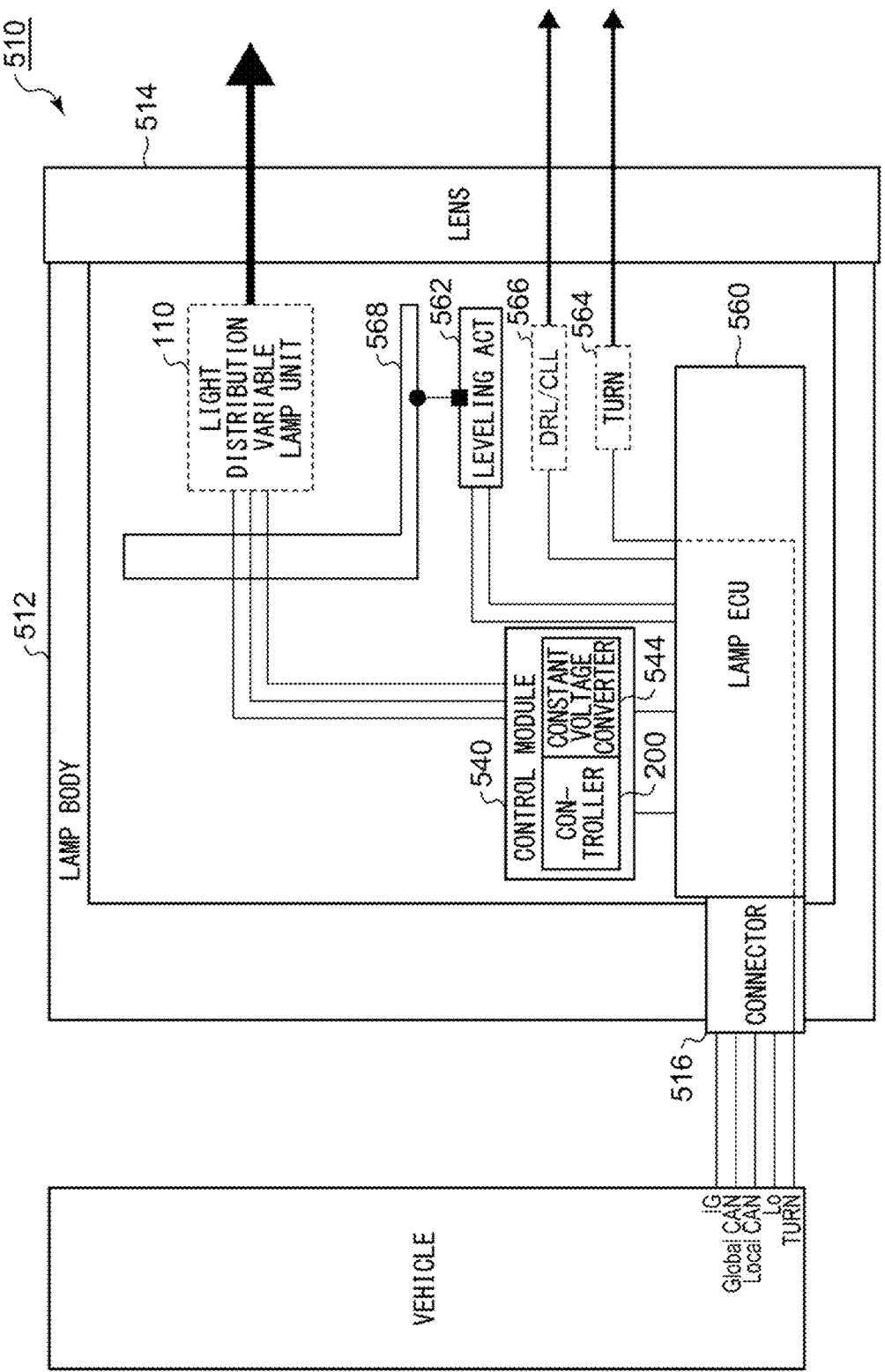
FIG. 23 is a diagram illustrating an example of a structure of the headlamp.

FIG. 23 is a diagram illustrating an example of a structure of the headlamp 510. The headlamp 510 includes a lamp body 512, a lens 514, a connector 516, a high-definition lamp unit 110, a control module 540, a lamp ECU 560, a leveling actuator 562, a turn lamp 564, a clearance lamp 566, and a lamp bracket 568.

The headlamp 510 is connected to the vehicle via a cable connected to the connector 516. The cable includes transmission lines of a power signal IG, a global CAN signal, a local CAN signal, a low-beam lighting instruction signal Lo, and a turn signal TURN (collectively referred to as a control signal).

The lamp ECU 560 controls ON and OFF and light distribution of the high-definition lamp unit 110 based on a control signal from the vehicle body. Further, the lamp ECU 560 controls ON and OFF of the turn lamp 564 and the clearance lamp 566.

The control module 540 is a unit that controls the high-definition lamp unit 110, and includes a controller 200 and a constant voltage converter 544. The controller 200 receives information on the pitch angle via a CAN interface of the lamp ECU 560. Note that a portion of the controller 200 corresponding to the pitch angle calculator 210 may be mounted in the lamp ECU 560.

The high-definition lamp unit 110 is supported by the lamp bracket 568. The lamp bracket 568 is tiltable in a pitching direction. The leveling actuator 562 can position the lamp bracket 568 in the pitching direction. The leveling actuator 562 can be used for optical axis adjustment (aiming) of the high-definition lamp unit 110.

Figure 24:
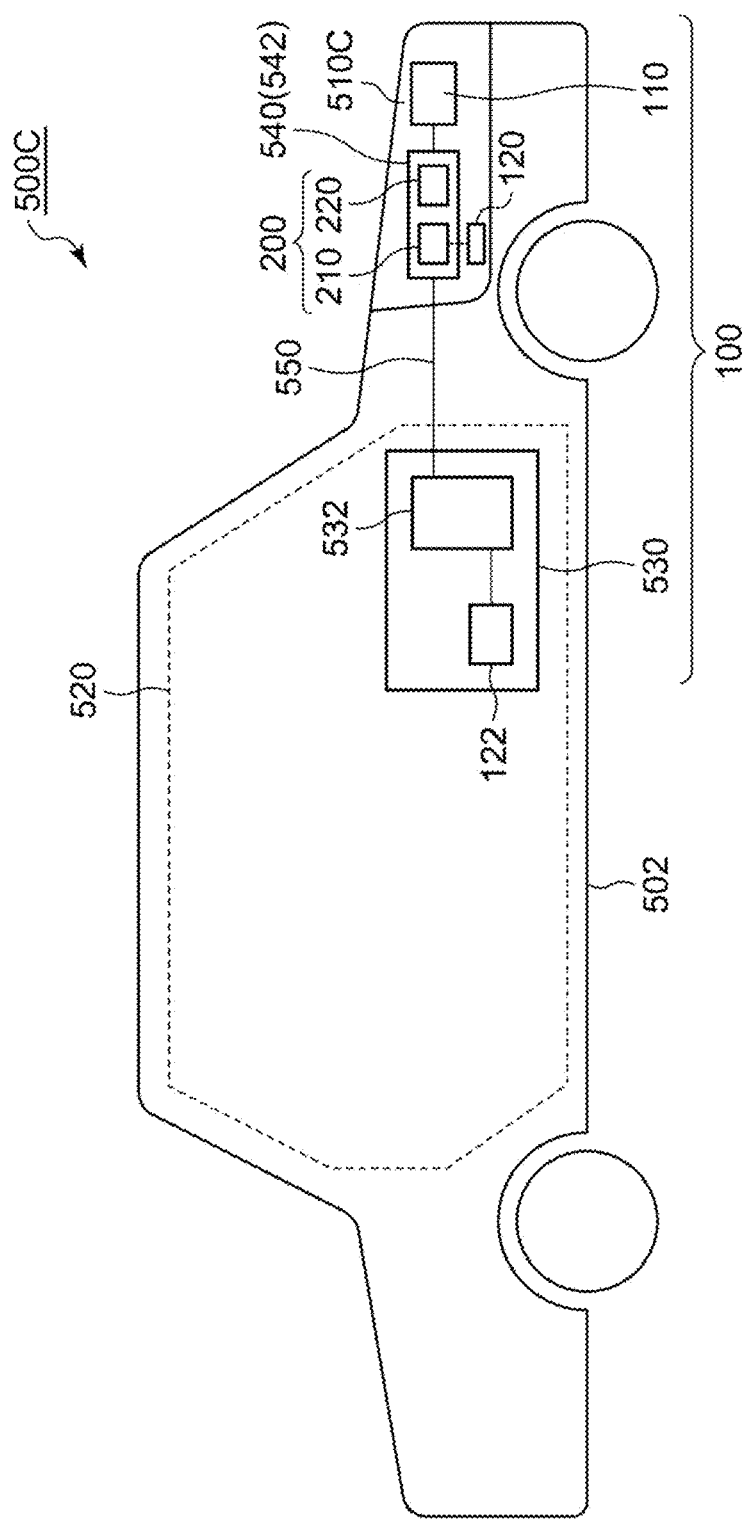
FIG. 24 is a diagram illustrating still another example of a design of a vehicle including the lamp system.

FIG. 24 is a diagram illustrating still another example of a design of a vehicle 500C including the lamp system 100. As described above, when the first sensor 120, which is a gyro sensor, is disposed in the vehicle interior, it is necessary to transmit information related to high-speed pitch angle variation via the vehicle bus 550, and responsiveness of the lamp system 100 is limited by a transmission delay.

In the example of FIG. 24, the first sensor 120, which is a gyro sensor, is provided inside the engine room outside the vehicle interior. More specifically, the first sensor 120 is provided in a headlamp 510C. That is, the first sensor 120 is a component of the headlamp 510C, and may be incorporated in the headlamp 510C or externally attached to the headlamp 510C.

In this example, the controller 200 including the pitch angle calculator 210 and the cutoff line controller 220 is also incorporated in the headlamp 510.

Connection between the controller 200 and the first sensor 120 does not require a vehicle bus such as a CAN, and a faster and lower-delay interface can be employed. A type of interface is not particularly limited, and a known serial interface or parallel interface can be used. For example, a serial peripheral interface (SPI), an I²C, etc. may be used as a serial interface.

Note that, since output of the second sensor 122 is mainly used for detection of the static pitch angle θs having a low frequency band, transmission delay is unlikely to be a problem. Therefore, the second sensor 122 is disposed outside the vehicle interior. Conversion from the output of the second sensor 122 to the second pitch angle θa may be performed in the second calculation processor 542 including the pitch angle calculator 210. That is, the second calculation processor 542 has a function as an interface of the vehicle bus 550.

Alternatively, conversion from the output of the second sensor 122 to the second pitch angle θa may be performed in the first calculation processor 532.

According to the design of FIG. 24, by disposing the gyro sensor on the headlamp side, it is possible to use a high-speed serial or parallel interface without using a vehicle bus, greatly reduce a transmission delay, and improve followability of leveling.

Figure 25:
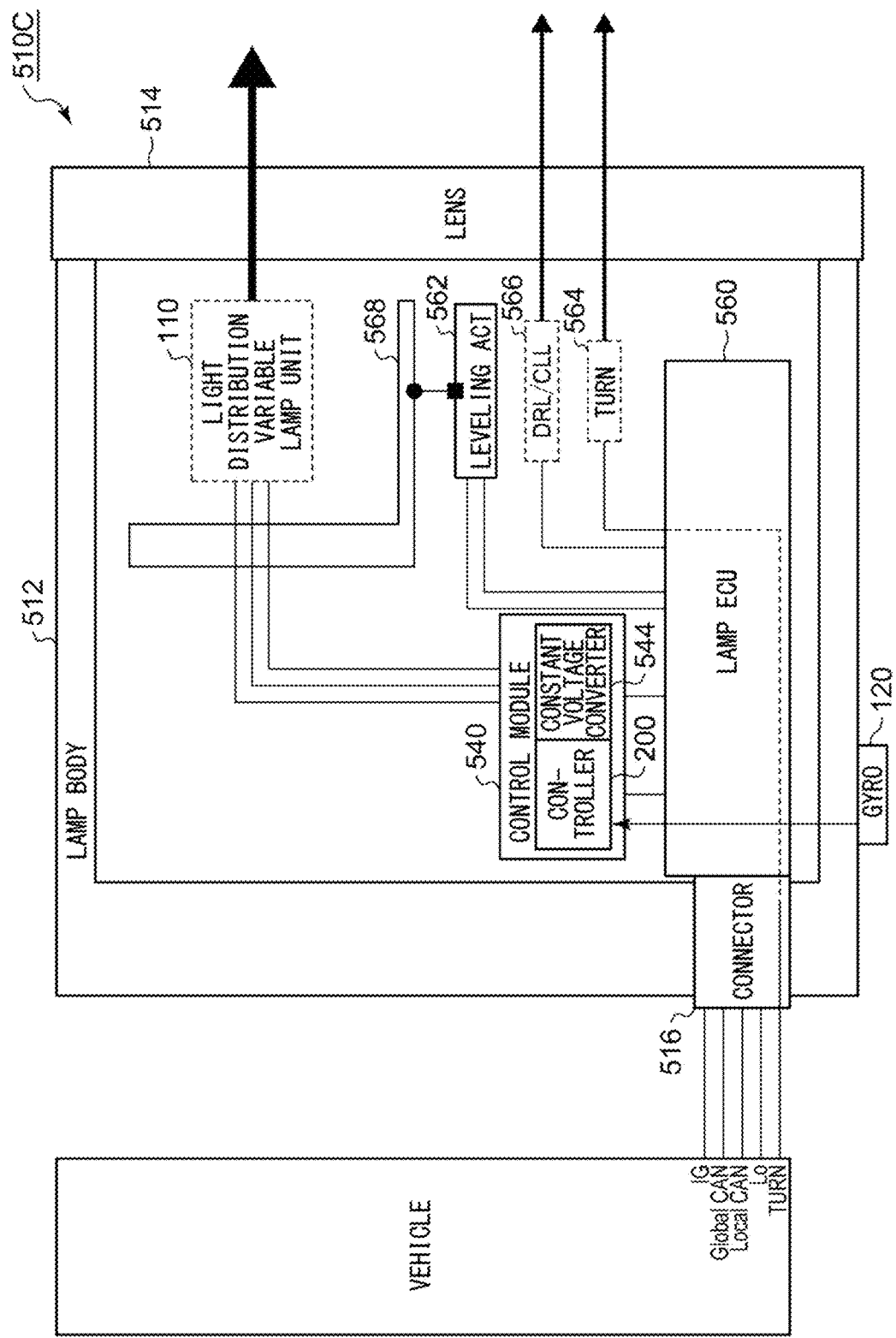
FIG. 25 is a diagram illustrating an example of a structure of the headlamp.

FIG. 25 is a diagram illustrating an example of a structure of the headlamp 510C. A basic configuration of the headlamp 510C is similar to that of the headlamp 510 of FIG. 23.

In this configuration, the first sensor 120 which is a gyro sensor is fixed to the lamp body 512. Detection accuracy of the gyro sensor can be enhanced by directly fixing the gyro sensor to the lamp body having the highest rigidity. As described above, the first sensor 120 and the controller 200 are connected by a serial or parallel local transmission line instead of a CAN interface. Note that a signal may or may not be transmitted from the first sensor 120 to the controller 200 via the lamp ECU 560.

More preferably, the gyro sensor is fixed to a bottom surface of the lamp body 512. A temperature distribution in the lamp body tends to be higher on the upper side and lower on the lower side. Therefore, by fixing the gyro sensor to the bottom surface having a relatively low temperature, an influence of heat received by the gyro sensor can be reduced.

In the configuration of FIG. 25, the first sensor 120 is provided outside the bottom surface of the lamp body. The temperature tends to be lower on the outside than on the inside of the lamp body 512. Therefore, by disposing the gyro sensor outside the lamp body, the influence of heat received by the gyro sensor can be reduced.

Figure 26:
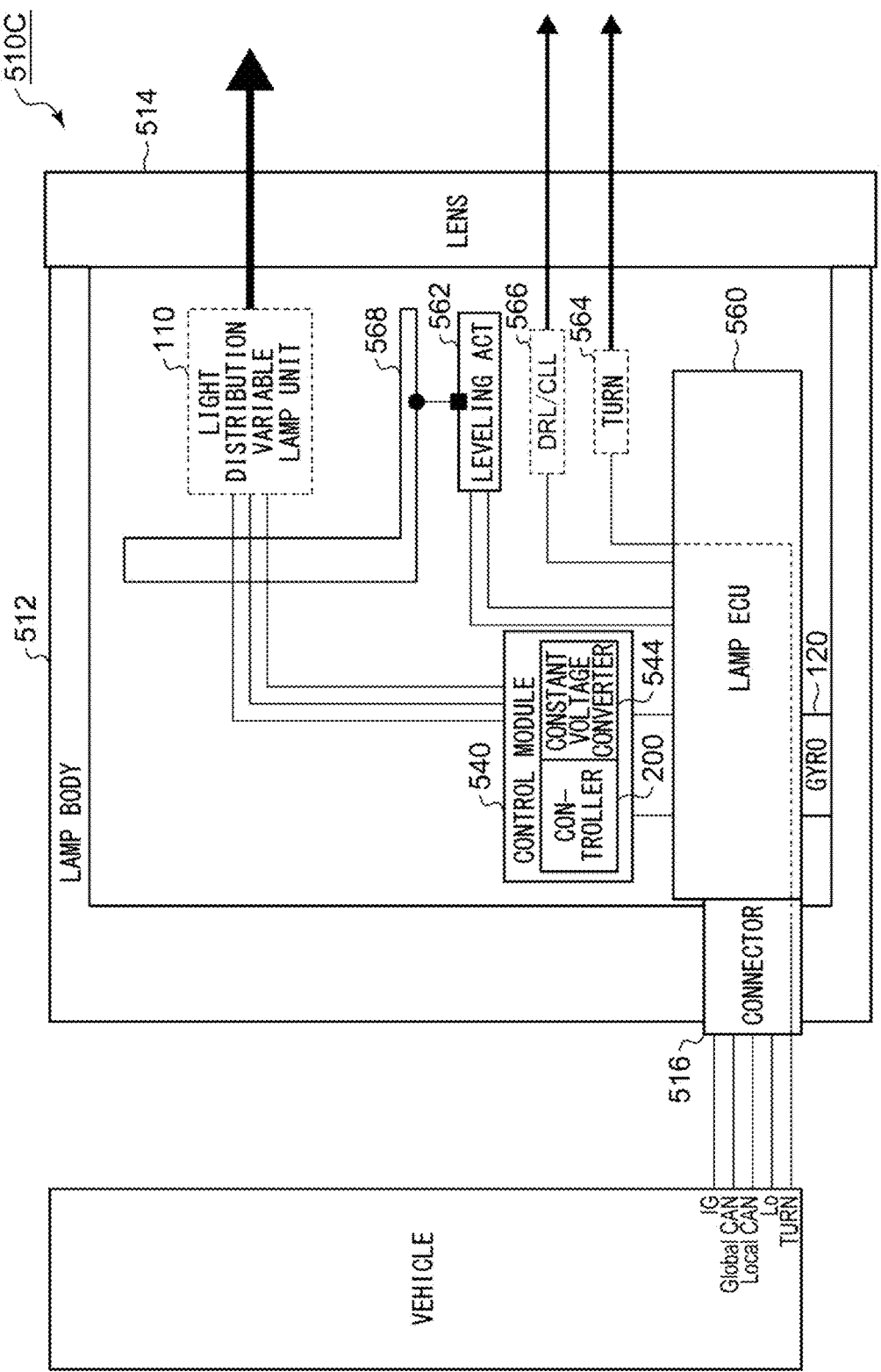
FIG. 26 is a diagram illustrating an example of a structure of the headlamp.

FIG. 26 is a diagram illustrating another example of a structure of the headlamp 510C. A basic configuration of the headlamp 510C of FIG. 26 is similar to that of the headlamp 510C of FIG. 25, and the first sensor 120 which is a gyro sensor is provided on the bottom surface side of the lamp body 512. A difference from FIG. 25 is that the first sensor 120 is disposed inside the lamp body 512. Even though this arrangement is disadvantageous from a viewpoint of heat when compared to FIG. 25, the first sensor 120 can be integrated with the lamp ECU 560. This simplifies the structure of the headlamp 510C.

Figure 27:
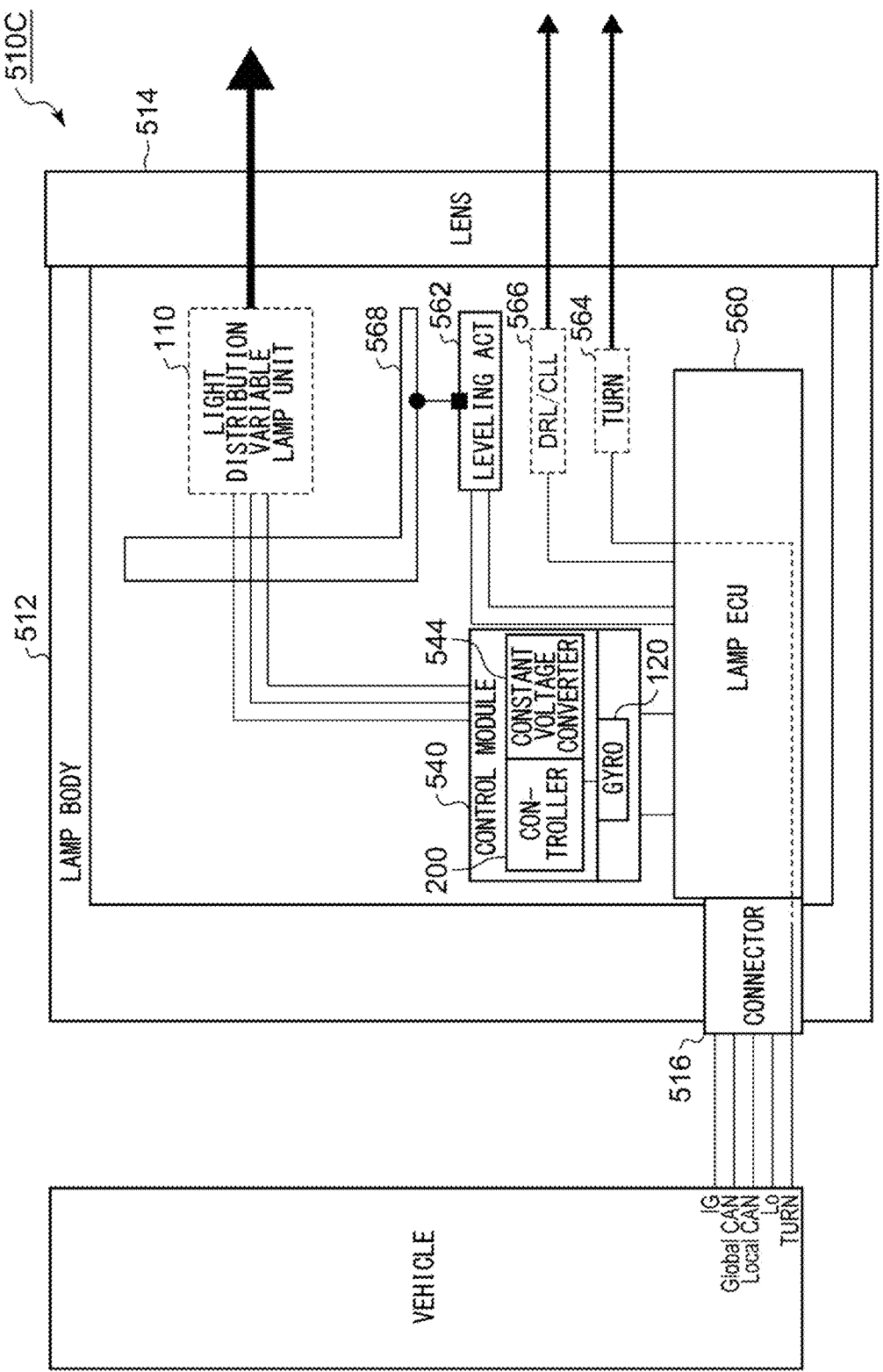
FIG. 27 is a diagram illustrating an example of a structure of the headlamp.

FIG. 27 is a diagram illustrating another example of a structure of the headlamp 510C. In the headlamp 510C of FIG. 27, the first sensor 120 which is a gyro sensor is incorporated in the control module 540. Preferably, the controller 200 and the first sensor 120 are mounted on the same control board.

Even though this arrangement is disadvantageous from a viewpoint of heat when compared to FIG. 25, since the gyro sensor and the controller 200 can be directly connected, the structure can be simplified, and the cost can be reduced. Further, there is an advantage from a viewpoint of transmission speed.

Modifications

It is understood by those skilled in the art that the above-described embodiments are examples, and various modifications can be made to combinations of the respective components and the respective processing processes. Hereinafter, such modifications will be described.

Modification 1

The second sensor 122 may use a vehicle height sensor instead of the acceleration sensor. The vehicle height sensor may be only a rear vehicle height sensor, or may be a hybrid of a rear vehicle height sensor and a front vehicle height sensor.

Modification 2

In the embodiment, the high-definition lamp unit 110 includes the light emitting element array 112, but the disclosure is not limited thereto. For example, the high-definition lamp unit 110 may include a light source that generates light having a substantially flat intensity distribution, and a spatial light modulator that spatially patterns emitted light of the light source. Examples of the spatial light modulator include a digital micromirror device (DMD) and a liquid crystal device.

Modification 3

A method in which the controller 200 shifts the position of the cutoff line CL in the vertical direction is not limited to that described in the embodiment. For example, the light emitting element array 112 may have a pixel shift function. In this case, image data as a reference and the pixel shift amount Δy may be given to the light emitting element array 112.

Modification 4

Control of the optical axis, that is, control of the height of the cutoff line is not limited to control by pixel control of the high-definition lamp unit 110 (electronic leveling). For example, a normal low beam unit may be configured to be controllable by a high-speed leveling actuator, and the height of the cutoff line may be controlled by changing an inclination of the low beam unit (referred to as mechanical leveling). Alternatively, the position of the light emitting element array 112 may be configured to be mechanically shiftable.

Alternatively, electronic leveling and mechanical leveling may be combined. In this case, electronic leveling may be applied to variation of the steep pitch angle, and mechanical leveling may be applied to changes in the gradual or static pitch angle.

Modification 5

In the embodiment, control for actively directing the optical axis upward when the vehicle body is inclined forward (nose-dive) during traveling of the vehicle has been described, but the application of the disclosure is not limited thereto. Control for directing upward is limited to static leveling, and in dynamic leveling, only control for directing downward may be performed without performing control for directing the optical axis upward.

Alternatively, control for directing the optical axis upward is limited to static leveling and low-speed dynamic leveling, and in high-speed dynamic leveling, only control for directing the optical axis downward may be performed without performing control for directing the optical axis upward.

Hybrid Leveling Control

Figure 28:
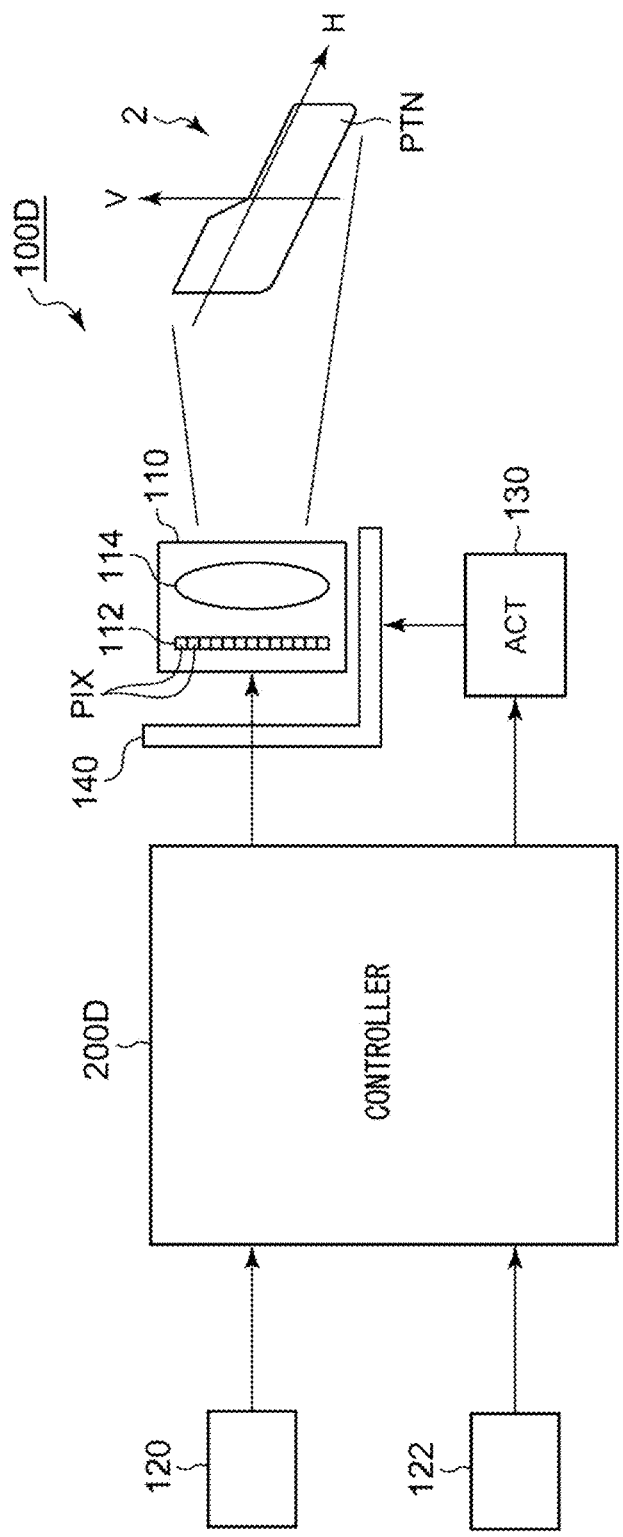
FIG. 28 is a block diagram of a lamp system corresponding to hybrid leveling control.

FIG. 28 is a block diagram of a lamp system 100D corresponding to hybrid leveling control. The lamp system 100D includes a high-definition lamp unit 110, a first sensor 120, a second sensor 122, a controller 200D, a leveling actuator 130, and a lamp bracket 140.

The high-definition lamp unit 110 is supported by a lamp bracket 140. The lamp bracket 140 is tiltable in a pitching direction. In response to control by the controller 200D, the leveling actuator 130 positions the lamp bracket 140 in the pitching direction and changes an emission direction four of emitted light of the high-definition lamp unit 110.

The high-definition lamp unit 110 includes a light emitting element array 112 and an irradiation optical system 114. The high-definition lamp unit 110 is configured to control a light distribution by controlling ON and OFF of the plurality of pixels PIX of the light emitting element array 112.

The controller 200D detects a pitch angle θp (θa, θj) based on outputs of the first sensor 120 and the second sensor 122, controls the light emitting element array 112 and the leveling actuator 130 based on the pitch angle θp, and controls a height of a cutoff line of the light distribution pattern PTN. Leveling control by the light emitting element array 112 is referred to as electronic leveling, and leveling control by the leveling actuator 130 is referred to as mechanical leveling. That is, the lamp system 100D is a hybrid of electronic leveling and mechanical leveling. Note that, in hybrid leveling control (also simply referred to as hybrid control), a method of detecting the pitch angle θp is not limited to a combination of the first sensor 120 and the second sensor 122.

Figure 29:
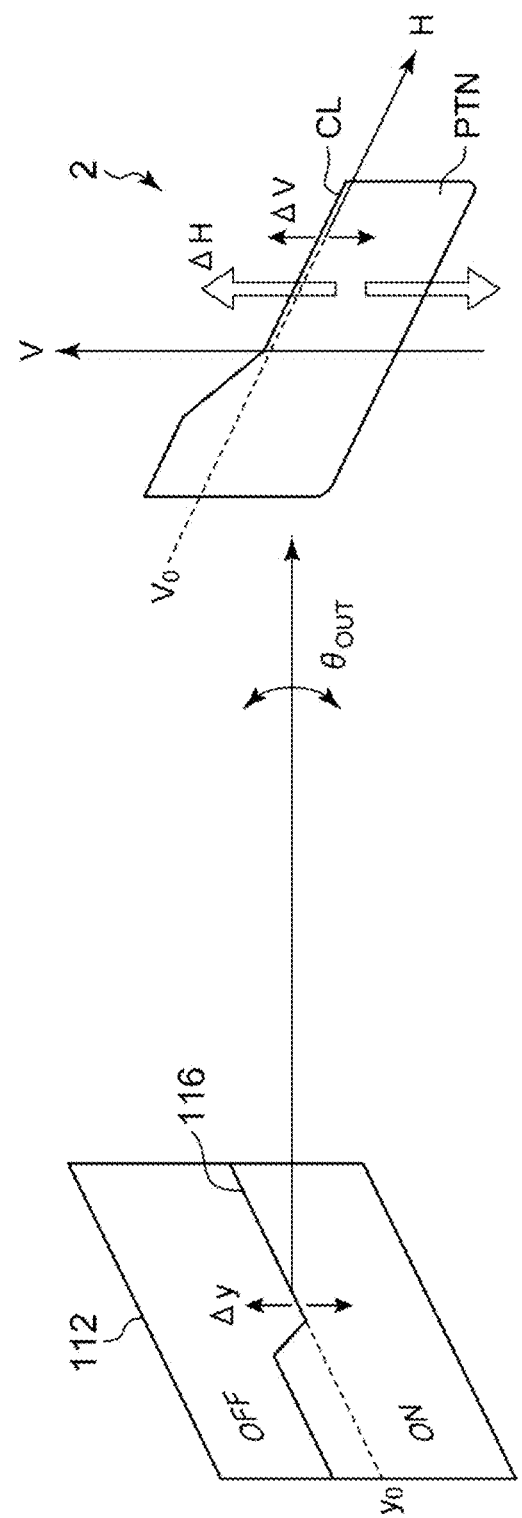
FIG. 29 is a diagram for describing hybrid control of electronic leveling and mechanical leveling.

FIG. 29 is a diagram for describing hybrid control of electronic leveling and mechanical leveling. A state of the light emitting element array 112, that is, image data, is illustrated on a left side of FIG. 29, and a light distribution pattern PTN on the virtual vertical screen 2 is illustrated on a right side.

The controller 200D shifts a position of the boundary 116 between an ON pixel and an OFF pixel included in the image data up and down by the number of pixels Δy of the control amount of electronic leveling. By electronic leveling, the cutoff line CL of the light distribution pattern PTN on the virtual vertical screen 2 moves in the vertical direction by a height ΔV corresponding to Δy.

In the case of control of only electronic leveling, the reference position $y_0$ is changed according to the static pitch angle θs. On the other hand, in hybrid control, the reference position $y_0$ of the boundary 116 is constant regardless of the static pitch angle θs, and instead of changing $y_0$, the leveling actuator 130 is controlled so that the direction $θ_{OUT}$ of the emitted light of the high-definition lamp unit 110 is changed. By mechanical leveling, the entire light distribution pattern PTN on the virtual vertical screen 2 moves in the up-down direction by a height ΔH corresponding to the change amount of $θ_{OUT}$.

Hybrid control by the controller 200D has been described above. Electronic leveling has high followability to high-speed pitch angle variation. On the other hand, mechanical leveling is inferior to electronic leveling in terms of speed, but can take a large control range of the optical axis (height of the cutoff line).

According to hybrid control, control difficult to perform by electronic leveling or mechanical leveling alone can be performed by combining two leveling controls having different characteristics.

Figure 30:
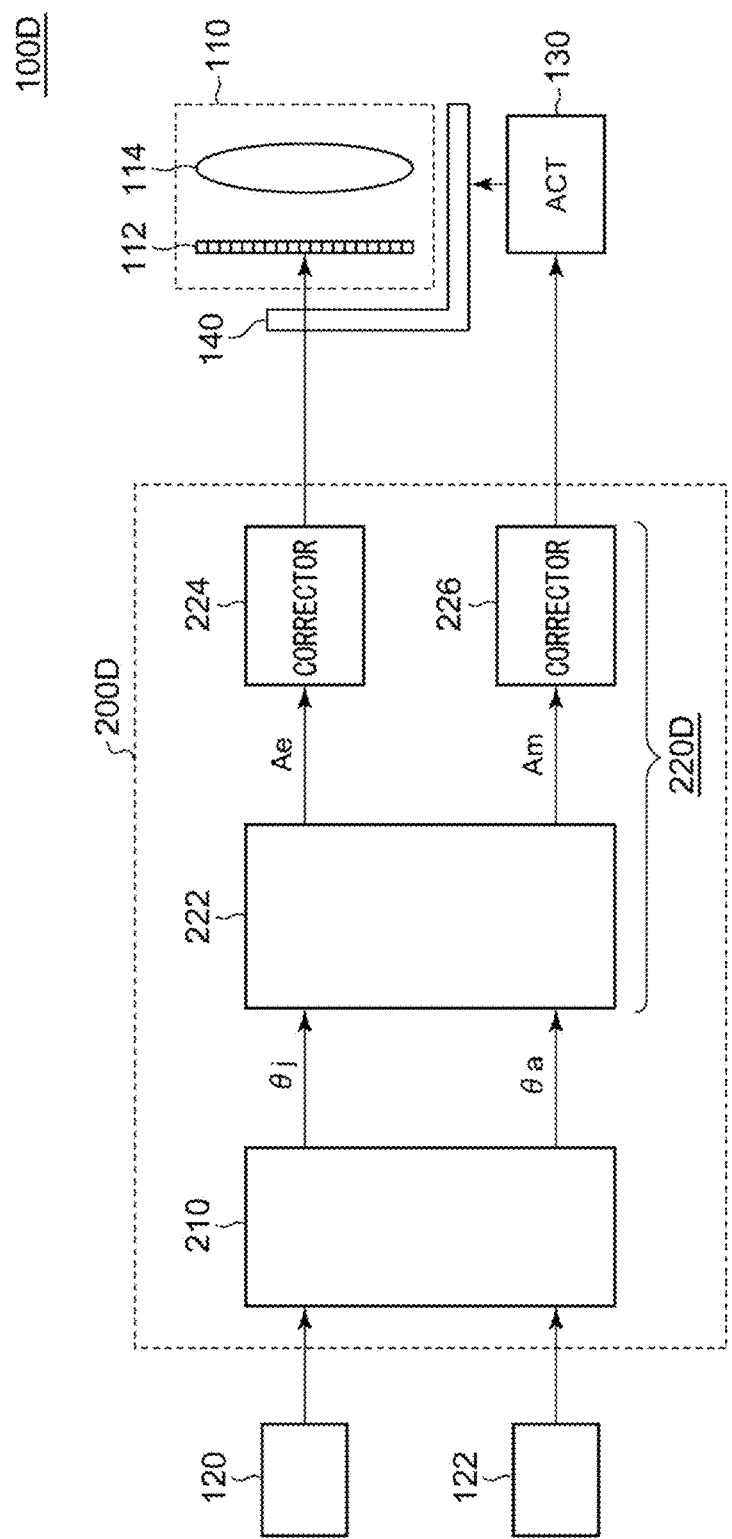
FIG. 30 is a block diagram illustrating a configuration example of a controller of the lamp system.

FIG. 30 is a block diagram illustrating a configuration example of the controller 200D of the lamp system 100D. The controller 200D includes a pitch angle calculator 210 and a cutoff line controller 220D. The cutoff line controller 220D includes a correction amount calculator 222 and correctors 224 and 226. The correction amount calculator 222 calculates the control amount Ae of electronic leveling and the control amount Am of mechanical leveling based on the pitch angles θj and θa. The corrector 224 generates image data to be supplied to the high-definition lamp unit 110 based on the control amount Ae. The corrector 226 generates a drive signal to the leveling actuator 130 based on the control amount Am.

Hereinafter, a specific example of hybrid control will be described.

First Control Example

In a first control example, a static component (static pitch angle) θs is assigned to mechanical leveling and a dynamic component (dynamic pitch angle) θd is assigned to electronic leveling. That is, the controller 200D controls the leveling actuator 130 according to the static component (static pitch angle) θs of the pitch angle θp of the vehicle body, and controls the light emitting element array 112 of the high-definition lamp unit 110 according to the dynamic component (dynamic pitch angle) θd of the pitch angle θp of the vehicle body.

Second Control Example

In a second control example, the static component (static pitch angle) θs and a low-frequency component of the dynamic component (dynamic pitch angle) θd are assigned to mechanical leveling, and a high-frequency component of the dynamic component (dynamic pitch angle) θd is assigned to electronic leveling. That is, when viewed as the entire pitch angle θp, a component lower than a predetermined frequency is assigned to mechanical leveling, and a component higher than the predetermined frequency is assigned to electronic leveling.

Third Control Example

In a third control example, the pitch angle θa based on output of the second sensor 122 is assigned to mechanical leveling, and the pitch angle θj detected based on output of the first sensor 120 (gyro sensor) is assigned to electronic leveling.

Fourth Control Example

In a fourth control example, mechanical leveling and electronic leveling change according to the magnitude of the amplitude of vibration of the pitch angle. That is, mechanical leveling is used when the amplitude is large, and electronic leveling is used when the amplitude is small.

Figure 31:
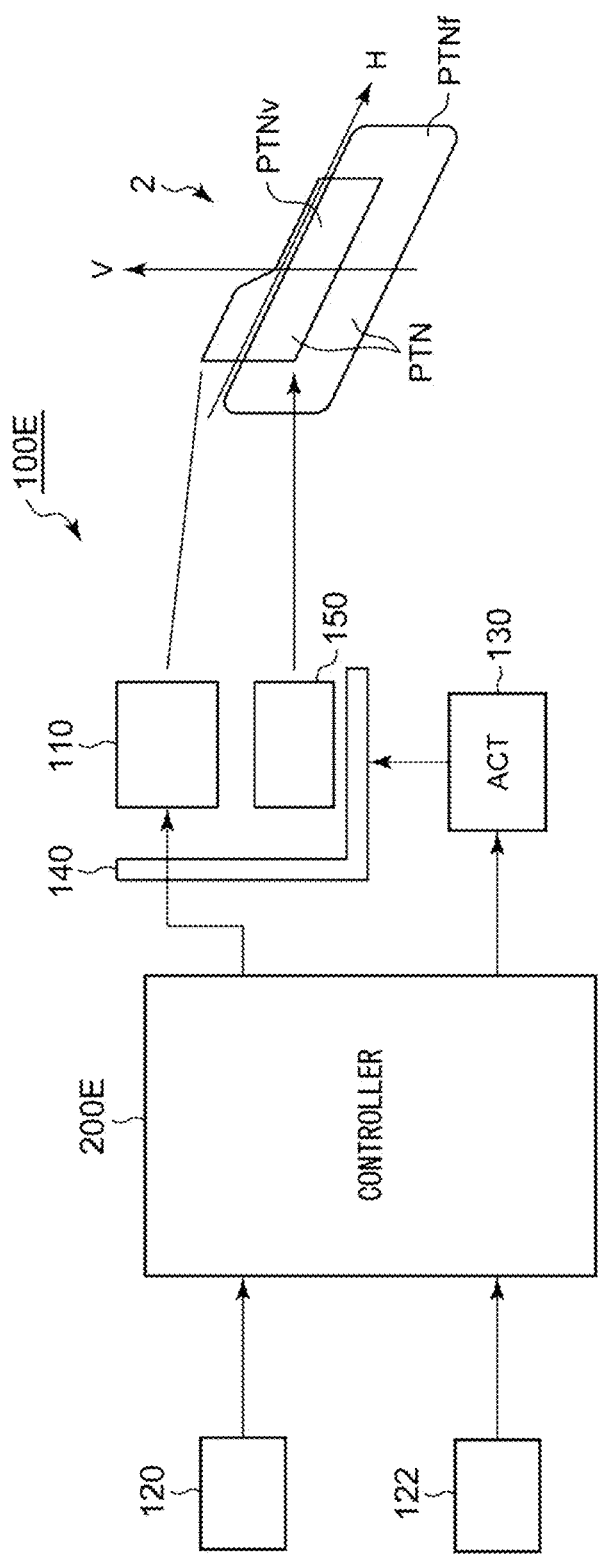
FIG. 31 is a block diagram of a lamp system corresponding to hybrid leveling control.

FIG. 31 is a block diagram of a lamp system 100E corresponding to hybrid leveling control. The lamp system 100E includes a fixed light distribution lamp unit 150 in addition to the lamp system 100D of FIG. 28.

The fixed light distribution lamp unit 150 emits lamp light having a fixed light distribution to the front of the vehicle. A light distribution pattern PTN on the virtual vertical screen 2 includes a variable pattern PTNv formed by lamp light of the fixed light distribution lamp unit 150 and a fixed pattern PTNf formed by lamp light of the high-definition lamp unit 110.

The fixed light distribution lamp unit 150 is configured to irradiate a lower region in a low-beam irradiation range with light, and the high-definition lamp unit 110 is configured to irradiate an upper region including a cutoff line in the low-beam irradiation range with light.

The high-definition lamp unit 110 and the fixed light distribution lamp unit 150 may form a beam serving as both a high beam and a low beam. That is, the high-definition lamp unit 110 is used for controlling a cutoff line of a low beam and is also used as a high-beam adaptive driving beam (ADB). In this case, the high-definition lamp unit 110 is configured to irradiate a high-beam irradiation range in addition to an upper region including the cutoff line in the low-beam irradiation range.

Figure 32B:
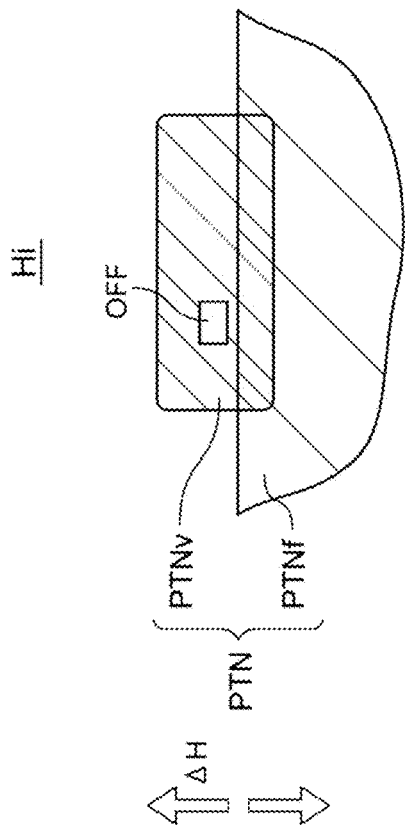
FIGS. 32A and 32B are diagrams for describing light distribution control by the lamp system of FIG. 31.
Figure 32A:
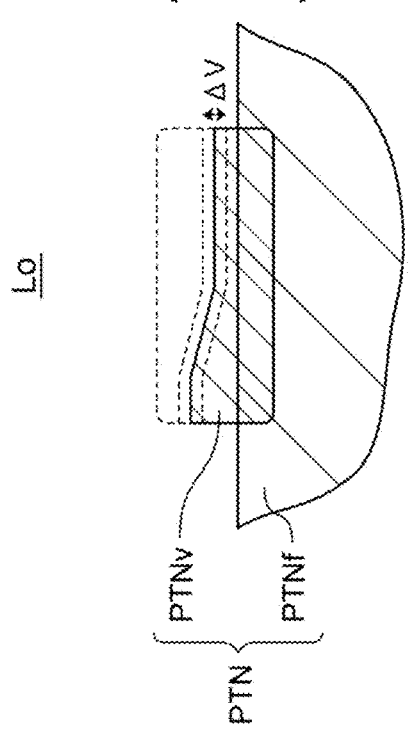

FIGS. 32A and 32B are diagrams for describing light distribution control by the lamp system 100E of FIG. 31. FIG. 32A illustrates light distribution control of a low beam.

The entire light distribution pattern is shifted up and down by ΔH by mechanical leveling. In addition, the cutoff line CL of the variable light distribution pattern PTNf in the irradiation range of the high-definition lamp unit 110 is vertically shifted by ΔV by electronic leveling.

FIG. 32B illustrates light distribution control of a high beam. When there is no oncoming vehicle or preceding vehicle in front of the vehicle, all (or most) pixels of the light emitting element array 112 are turned on, and a high-beam light distribution is formed. When an oncoming vehicle or a preceding vehicle is detected in front of the vehicle, the corresponding pixel of the light emitting element array 112 is turned off in order to turn off a light shielding region in the part. During the high beam, electronic leveling may be disabled, and only mechanical leveling may be performed.

Figure 33:
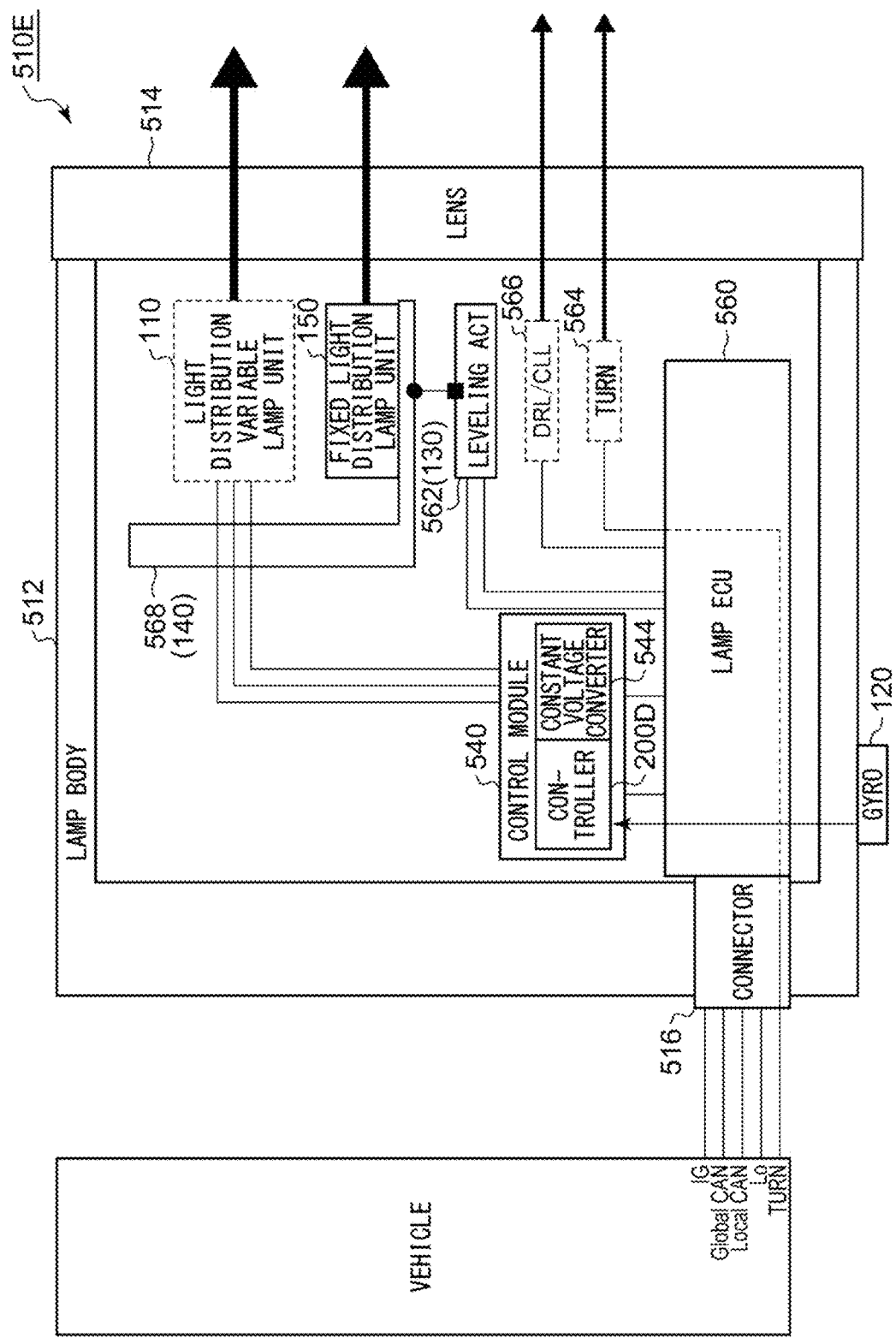
FIG. 33 is a diagram illustrating an example of a structure of the lamp system of FIG. 31.

FIG. 33 is a diagram illustrating an example of a structure of the lamp system 100E of FIG. 31. The lamp system 100E includes a fixed light distribution lamp unit 150 in addition to the configuration of FIG. 19. Note that a position of the first sensor 120 is not limited, and may be provided on the vehicle body side.

The corrector 226 of FIG. 30 may be mounted as a controller (or a driver) of the leveling actuator (1) included in the lamp ECU 560. In addition, a portion of the controller 200D corresponding to the pitch angle calculator 210 may also be mounted in the lamp ECU 560.

Figure 34:
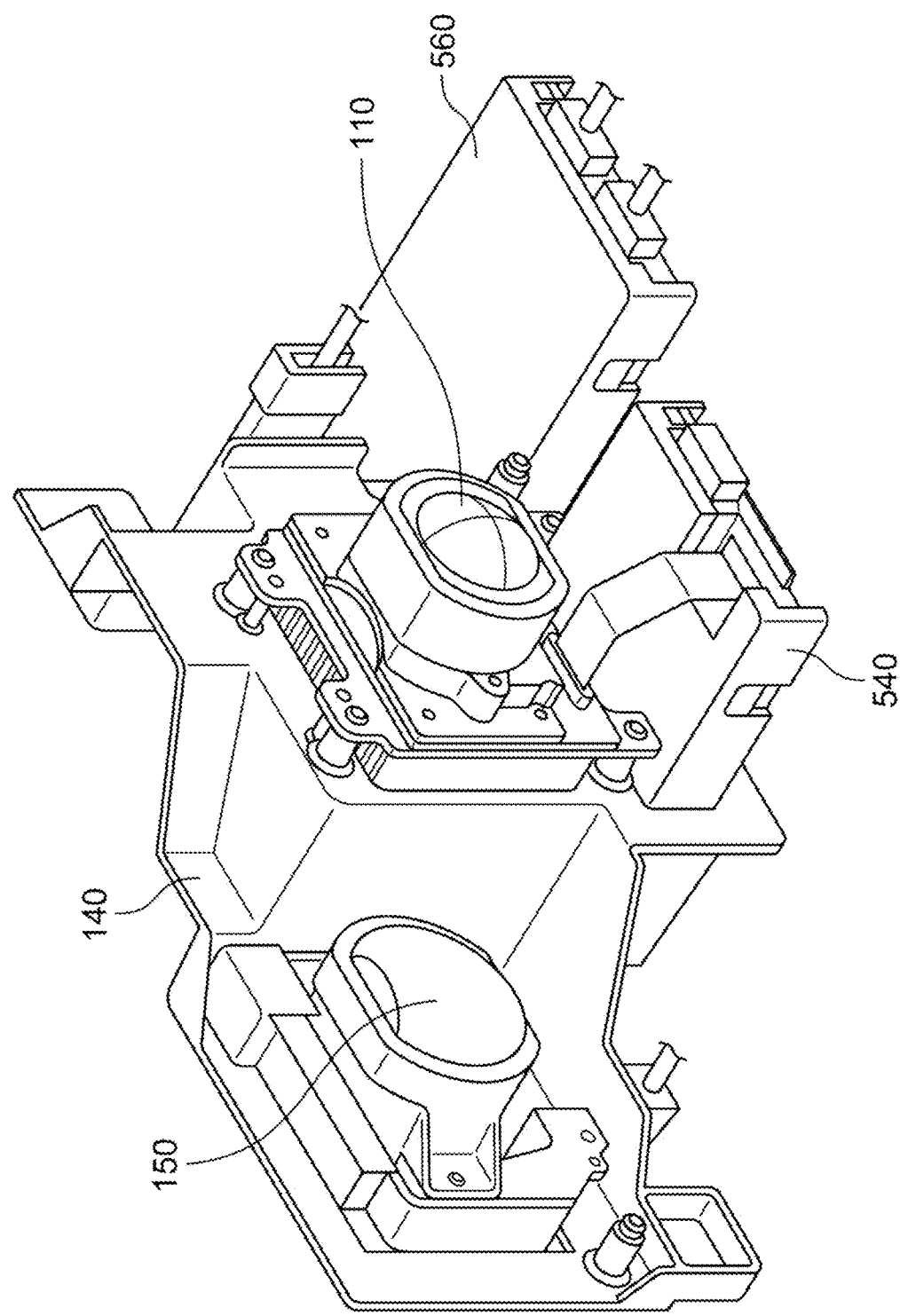
FIG. 34 is a perspective view of the lamp system of FIG. 31.

FIG. 34 is a perspective view of the lamp system 100E of FIG. 31. The high-definition lamp unit 110 and the fixed light distribution lamp unit 150 are attached to a common lamp bracket 140. The lamp bracket 140 is rotatably attached to the lamp body in the pitching direction in a movable portion (not illustrated). The control module 540 and the lamp ECU 560 are disposed on the bottom surface side of the lamp system 100E.

Modifications

It is understood by those skilled in the art that the above-described embodiments are examples, and various modifications can be made to combinations of the respective components and the respective processing processes. Hereinafter, such modifications will be described.

Modification 1

The second sensor 122 may use a vehicle height sensor instead of the acceleration sensor. The vehicle height sensor may be only a rear vehicle height sensor, or may be a hybrid of a rear vehicle height sensor and a front vehicle height sensor.

Modification 2

In the embodiment, the high-definition lamp unit 110 includes the light emitting element array 112, but the disclosure is not limited thereto. For example, the high-definition lamp unit 110 may include a light source that generates light having a substantially flat intensity distribution, and a spatial light modulator that spatially patterns emitted light of the light source. Examples of the spatial light modulator include a digital micromirror device (DMD) and a liquid crystal device.

Modification 3

A method in which the controller 200 shifts the position of the cutoff line CL in the vertical direction is not limited to that described in the embodiment. For example, the light emitting element array 112 may have a pixel shift function. In this case, image data as a reference and the pixel shift amount Δy may be given to the light emitting element array 112.

Modification 4

Control of the optical axis, that is, control of the height of the cutoff line is not limited to control by pixel control of the high-definition lamp unit 110 (electronic leveling). For example, a normal low beam unit may be configured to be controllable by a high-speed leveling actuator, and the height of the cutoff line may be controlled by changing an inclination of the low beam unit (referred to as mechanical leveling). Alternatively, the position of the light emitting element array 112 may be configured to be mechanically shiftable.

Alternatively, electronic leveling and mechanical leveling may be combined. In this case, electronic leveling may be applied to variation of the steep pitch angle, and mechanical leveling may be applied to changes in the gradual or static pitch angle.

Modification 5

In the embodiment, control for actively directing the optical axis upward when the vehicle body is inclined forward (nose-dive) during traveling of the vehicle has been described, but the application of the disclosure is not limited thereto. Control for directing upward is limited to static leveling, and in dynamic leveling, only control for directing downward may be performed without performing control for directing the optical axis upward.

Alternatively, control for directing the optical axis upward is limited to static leveling and low-speed dynamic leveling, and in high-speed dynamic leveling, only control for directing the optical axis downward may be performed without performing control for directing the optical axis upward.

Even though the disclosure has been described using specific phrases based on the embodiments, the embodiments merely illustrate the principle and application of the disclosure, and the embodiments may include many modifications and changes in arrangement without departing from the spirit of the disclosure defined in the claims.

What is claimed is:

1. A lamp system comprising:
   a light distribution variable lamp including a plurality of individually controllable pixels and structured to emit lamp light having a light distribution according to states of the plurality of pixels;
   a first sensor including a gyro sensor, wherein the first sensor is adaptive to detect a dynamic component of the pitch angle of a vehicle body;
   a second sensor including a vehicle height sensor or an acceleration sensor, wherein the second sensor is adaptive to detect a static component of the pitch angle of the vehicle body;
   a leveling actuator structured to control a mechanical position of the light distribution variable lamp; and
   a controller structured to control the leveling actuator and the light distribution variable lamp according to a pitch angle of a vehicle body according to the static component of the pitch angle of the vehicle body detected by the second sensor and to control the states of the plurality of pixels of the light distribution variable lamp according to the dynamic component of the pitch angle of the vehicle body detected by the first sensor.

2. The lamp system according to claim 1, further comprising:
   a fixed light distribution lamp structured to form a fixed light distribution; and
   a lamp bracket structured to support the fixed light distribution lamp and the light distribution variable lamp,
   wherein the leveling actuator is structured to control a position of the lamp bracket.

* * * * *